United States Patent
Zhu et al.

(10) Patent No.: US 11,359,697 B2
(45) Date of Patent: Jun. 14, 2022

(54) LOCKING DEVICE, POWER ASSEMBLY, POWER TRANSMISSION SYSTEM, AND VEHICLE

(71) Applicant: BYD COMPANY LIMITED, Guangdong (CN)

(72) Inventors: Yanyan Zhu, Shenzen (CN); Yu Hua, Shenzen (CN); Jing Liu, Shenzen (CN); Lingdao Chai, Shenzen (CN); Jintao Zhang, Shenzen (CN)

(73) Assignee: BYD Company Limited, Shenzhen (CN)

( * ) Notice: Subject to any disclaimer, the term of this patent is extended or adjusted under 35 U.S.C. 154(b) by 473 days.

(21) Appl. No.: 16/475,005

(22) PCT Filed: Dec. 21, 2017

(86) PCT No.: PCT/CN2017/117820
§ 371 (c)(1),
(2) Date: Jun. 28, 2019

(87) PCT Pub. No.: WO2018/121419
PCT Pub. Date: Jul. 5, 2018

(65) Prior Publication Data
US 2019/0338834 A1    Nov. 7, 2019

(30) Foreign Application Priority Data

Dec. 30, 2016  (CN) .......................... 201611265803.5

(51) Int. Cl.
*F16D 27/118*  (2006.01)
*F16D 27/12*   (2006.01)
(Continued)

(52) U.S. Cl.
CPC ................. *F16H 1/22* (2013.01); *B60K 1/02* (2013.01); *B60K 17/04* (2013.01); *F16D 27/118* (2013.01); *F16D 27/12* (2013.01)

(58) Field of Classification Search
CPC ............... F16H 1/22; F16H 2200/0008; F16H 2200/0013; F16H 2200/0017; B60K 1/02;
(Continued)

(56) References Cited

U.S. PATENT DOCUMENTS 6,637,572 B2 * 10/2003 Tomari .................... F16D 27/12
                                                          192/84.91
8,678,118 B2 *  3/2014 Takenaka ............... B60K 6/442
                                                          180/65.6
(Continued)

FOREIGN PATENT DOCUMENTS

CN    1062782 A    7/1992
CN    1115016 A    1/1996
(Continued)

OTHER PUBLICATIONS

PCT International Search Report and Written Opinion, PCT Application No. PCT/CN/2017/117820, dated Mar. 20, 2018, 8 pages.

*Primary Examiner* — Richard W Ridley
*Assistant Examiner* — Aimee Tran Nguyen
(74) *Attorney, Agent, or Firm* — Fenwick & West LLP

(57) ABSTRACT

A locking device comprising: first and second flanges; and first and second flange locking structures. The first and second flange locking structures are used for selectively locking the first flange and the second flange. Each flange locking structure comprises: a synchronising ring and a driving assembly. The synchronising ring is able to slide relative to the corresponding flange; and the drive assembly is capable of selectively pushing the synchronising ring to (Continued)

slide along the axial direction of the corresponding flange from an unlocked position to a locked position.

20 Claims, 18 Drawing Sheets

(51) Int. Cl.
  *B60K 1/02* (2006.01)
  *F16H 1/22* (2006.01)
  *B60K 17/04* (2006.01)
(58) Field of Classification Search
  CPC ......... B60K 17/04; B60K 17/34; F16D 23/04; F16D 27/118; F16D 27/12; F16D 27/10; F16D 3327/09; F16D 23/00
  See application file for complete search history.

(56) References Cited

U.S. PATENT DOCUMENTS

| | | | |
|---|---|---|---|
| 10,473,169 B2 * | 11/2019 | Yoshisaka | F16D 11/14 |
| 11,053,989 B2 * | 7/2021 | Zhu | B60K 17/04 |
| 2003/0127260 A1 | 7/2003 | Jorge | |
| 2004/0050587 A1 | 3/2004 | Koji et al. | |
| 2007/0119678 A1 * | 5/2007 | Houle | F16D 27/12 |
| | | | 192/69.8 |
| 2011/0253077 A1 * | 10/2011 | Boffelli | F01P 7/084 |
| | | | 123/41.44 |
| 2014/0144266 A1 | 5/2014 | Ho et al. | |
| 2014/0291100 A1 * | 10/2014 | Sharp | F16D 41/16 |
| | | | 192/43.1 |

FOREIGN PATENT DOCUMENTS

| | | |
|---|---|---|
| CN | 201165197 Y | 12/2008 |
| CN | 201291750 Y | 8/2009 |
| CN | 102673373 A | 9/2012 |
| CN | 103587403 A | 2/2014 |
| CN | 103591178 A | 2/2014 |
| CN | 103899671 A | 7/2014 |
| CN | 104276025 A | 1/2015 |
| CN | 104827884 A | 8/2015 |
| CN | 104847807 A | 8/2015 |
| CN | 104972888 A | 10/2015 |
| CN | 105459781 A | 4/2016 |
| CN | 105889352 A | 8/2016 |
| CN | 206426827 U | 8/2017 |
| DE | 102011080068 A1 | 1/2013 |
| DE | 102015100906 A1 | 7/2016 |
| EP | 1911622 A1 | 4/2008 |
| FR | 2902477 B1 | 8/2008 |
| JP | 2015190549 A | 11/2015 |

\* cited by examiner

LOCKING DEVICE, POWER ASSEMBLY, POWER TRANSMISSION SYSTEM, AND VEHICLE

CROSS-REFERENCE TO RELATED APPLICATIONS

This application is the National Stage of International Application No. PCT/CN2017/117820, "Locking Apparatus, Powertrain, Power Transmission System, and Vehicle," filed Dec. 21, 2017; which claims priority to and benefits of Chinese Patent Application Serial No. 2016-11265803.5, filed with the State Intellectual Property Office of P. R. China on Dec. 30, 2016. The entire content of the above-referenced applications are incorporated herein by reference.

FIELD

The present invention relates to the field of vehicle technology, and in particular to a locking device, a power assembly having the locking device, a power transmission system having the power assembly, and a vehicle having the power transmission system.

BACKGROUND

In the related art, when the power transmission system adopts the wheel-side drive form, the power assembly occupies a large space, the vehicle layout is unreasonable, and the mounting and dismounting steps are complicated. Meanwhile, the power components that drive the two wheels are independent of each other. When the wheel on one side slips or the wheel-side motor on one side is damaged, the vehicle cannot work or cannot escape, so there is room for improvement.

SUMMARY

An objective of the present invention is to at least resolve one of the technical problems in the related art to some extent. To this end, the present invention provides a locking device which is simple in structure.

The present invention further provides a power assembly having the above locking device.

The present invention further provides a power transmission system having the above power assembly.

The present invention further provides a vehicle having the above power transmission system.

The locking device according to the present invention includes: a first flange, the first flange being adapted to be fixed on a first shaft; a second flange, the second flange being adapted to be fixed on a second shaft; a first flange locking structure, the first flange locking structure being used for selectively locking the first flange and the second flange to be adapted to rotate the second flange synchronously with the first flange; and a second flange locking structure, the second flange locking structure being used for selectively locking the second flange and the first flange to be adapted to rotate the first flange synchronously with the second flange; wherein the first flange locking structure and the second flange locking structure each include: a synchronizing ring, the synchronizing ring being normally connected to the corresponding flange to be adapted to rotate synchronously with the corresponding flange, and the synchronizing ring being slidable relative to the corresponding flange; and a driving component, the driving component selectively pushing the synchronizing ring to slide from an unlocked position to a locked position in an axial direction of the corresponding flange, wherein when the synchronizing ring is in the locked position, the two synchronizing rings are connected to be adapted to rotate the other flange synchronously with the flange corresponding to the synchronizing ring, and when the synchronizing ring is in the unlocked position, the two synchronizing rings are separated.

The locking device according to embodiments of the present invention can realize the two-way locking function, and is simple in structure.

The power assembly according to embodiments of the present invention includes: a first power component and a second power component, the first power component being used for driving a wheel on the left side, the second power component being used for driving a wheel on the right side, the first power component and the second power component each including a motor and a transmission, and the transmission being adapted to be connected between the motor and the wheel on the corresponding side; and the locking device according to the embodiments of the first aspect, the first power component including a first shaft, the second power component including a second shaft, the first flange being fixed on the first shaft, the second flange being fixed on the second shaft, and the locking device being used for selectively synchronizing the first shaft and the second shaft.

By using the power assembly according to the embodiments of the present invention, by providing the locking device to synchronize the first power component and the second power component, when the wheel on one side slips or the motor on one side is damaged or fails, the vehicle can still operate and has a strong ability to escape.

The power transmission system according to embodiments of the present invention includes at least one of the power assemblies described in the above embodiments, so that when the wheel on one side slips or the motor on one side is damaged or fails, the vehicle can still operate and has a strong ability to escape.

The vehicle according to embodiments of the present invention includes the above-described power transmission system, so that the vehicle has a strong ability to escape and adapts to various working conditions.

REFERENCE NUMERALS OF THE ACCOMPANYING DRAWING

Figure 1:
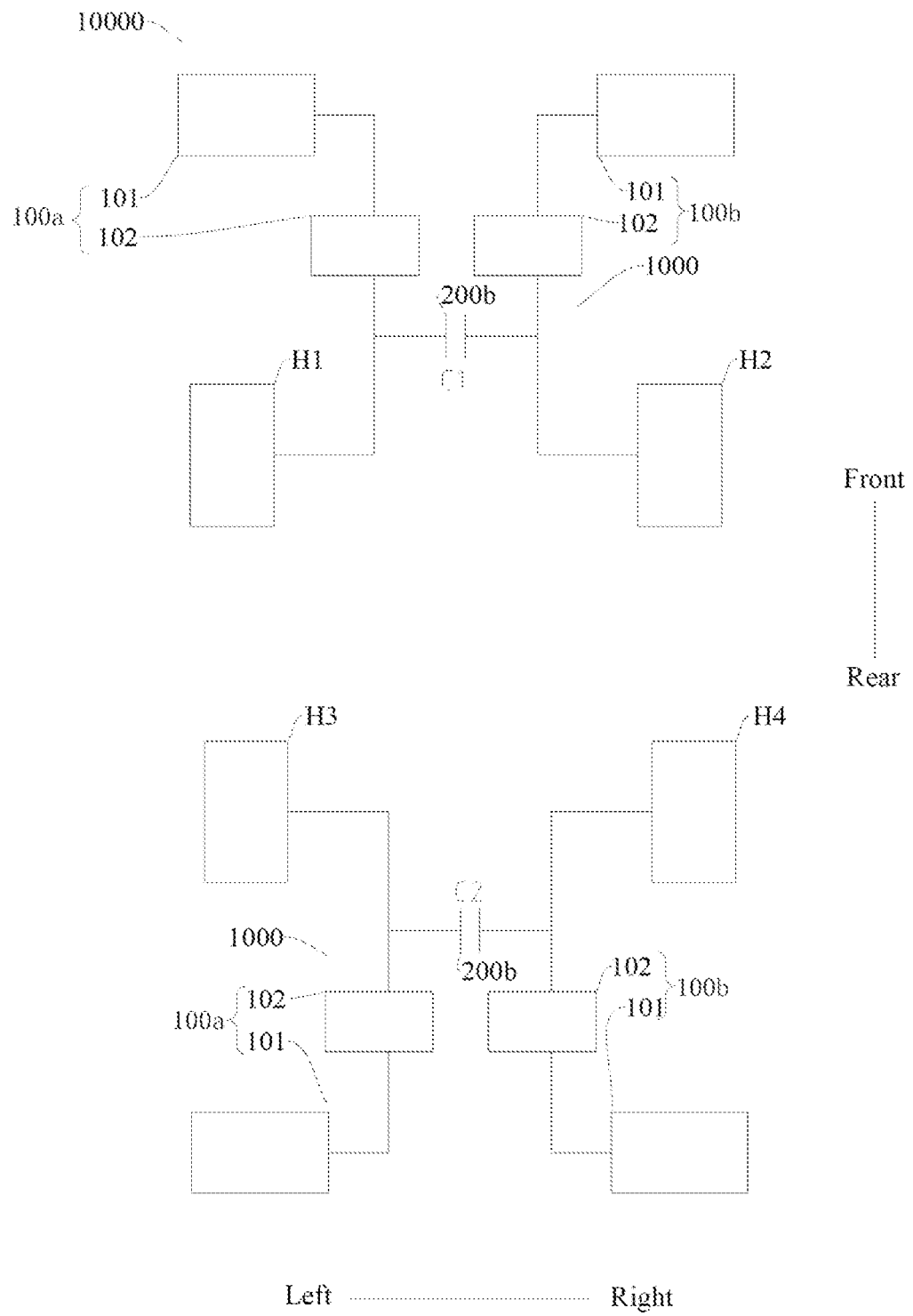
FIG. 1 is a structural block diagram of a power transmission system according to embodiments of the present invention.

Power transmission system 10000, power assembly 1000, first power component 100a, motor 101, transmission 102, input shaft I, first intermediate shaft II, second intermediate shaft III, locking device connecting portion C, output shaft IV, primary driving gear 1a, primary driven gear 1b, secondary driving gear 2a, secondary driven gear 2b, tertiary driving gear 3a, tertiary driven gear 3b, housing 103, first housing 1031, motor housing 10311, first sub-transmission housing 10312, input shaft mounting hole P1, first intermediate shaft mounting hole P2, second intermediate shaft mounting hole P3, output shaft mounting hole P4, second housing 1032, intermediate housing 104, surface W1, accommodating cavity 1041, latching structure 1042, first mounting hole R1, second mounting hole R2, third mounting hole R3, fourth mounting hole R4, bearing B1, second power component 100b, locking device 200, first locking device C1, second locking device C2, one-way locking device 200a, first flange 201a, first fixing sleeve 2011a, first mounting sleeve 2012a, first guiding sleeve 2013a, guiding groove 20131a, internal tooth groove 20132a, second flange 201b, second fixing sleeve 2011b, second mounting sleeve 2012b, second guiding sleeve 2013b, outer tooth groove 20132b, through hole D, synchronizing ring 202, outer ring gear portion 2021, inner ring gear portion 2022, intermediate connecting portion 2023, driving component 203, electromagnet 2031, ejector pin 2032, driving member 2033, driving profile S, bushing 204, elastic return member 205, two-way locking device 200b, first flange 201a, first fixing sleeve 2011a, first mounting sleeve 2012a, first guiding sleeve 2013a, first guiding groove 20131a, inner tooth groove 20132a, second flange 201b, second fixing sleeve 2011b, second mounting sleeve 2012b, second guiding sleeve 2013b, outer tooth groove 20132b, first through hole D1, concave portion J, fitting end surface M, first flange locking structure Q1, first synchronizing ring 202a, first outer ring gear portion 2021a, first inner ring gear portion 2022a, first intermediate connecting portion 2023a, first driving component 203a, first electromagnet 2031a, first ejector pin 2032a, first driving member 2033a, first driving profile S1, first bushing 204a, first elastic return member 205a, first stopping piece 206a, second flange locking structure Q2, second synchronizing ring 202b, second outer ring gear portion 2021b, second inner ring gear portion 2022b, second intermediate connecting portion 2023b, second driving component 203b, second electromagnet 2031b, second ejector pin 2032b, second driving member 2033b, second driving profile S1, second bushing 204b, second elastic return member 205b, second stop piece 206b, second through hole D2, first threaded connecting piece 207a, second threaded connecting piece 207b, flange assembly 300, left front wheel H1, right front wheel H2, left rear wheel H3, right rear wheel H4, first shaft X1, second shaft X2.

DETAILED DESCRIPTION

The embodiments of the present invention are described in detail below. Examples of the embodiments are illustrated in the accompanying drawings. The following embodiments described with reference to the accompanying drawings are exemplary, and are intended to describe the present invention and cannot be construed as a limitation to the present invention.

Figure 2:
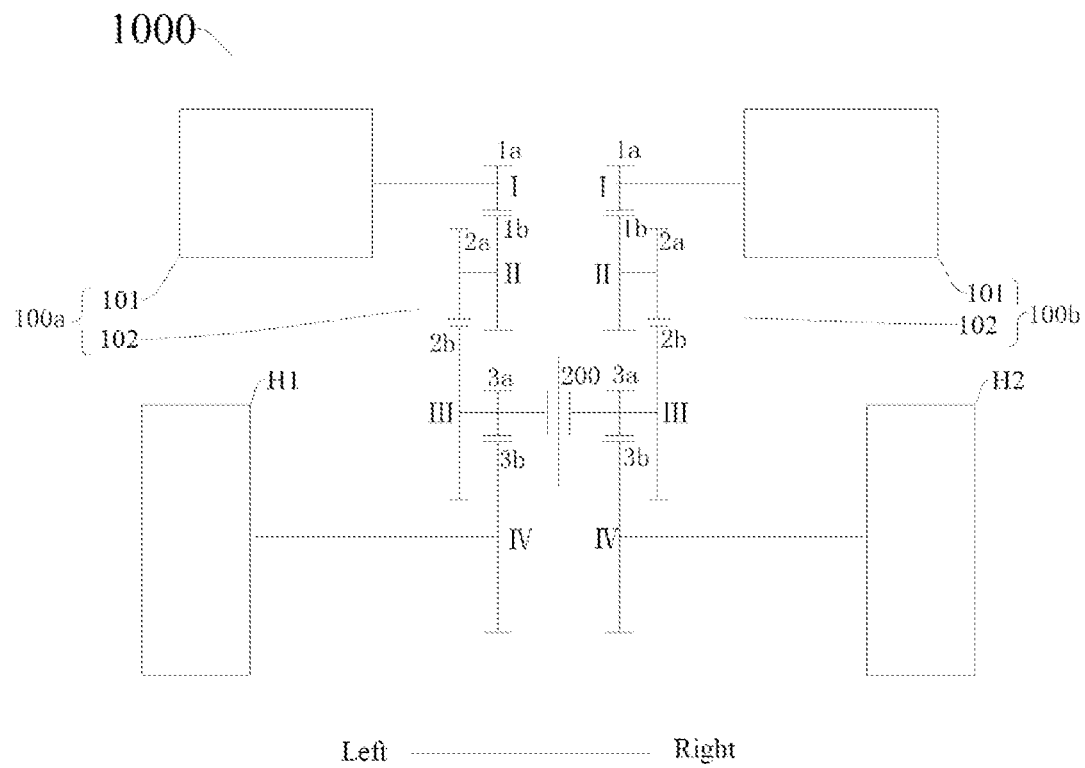
FIG. 2 is a schematic structural view of the power transmission system according to embodiments of the present invention.
Figure 3:
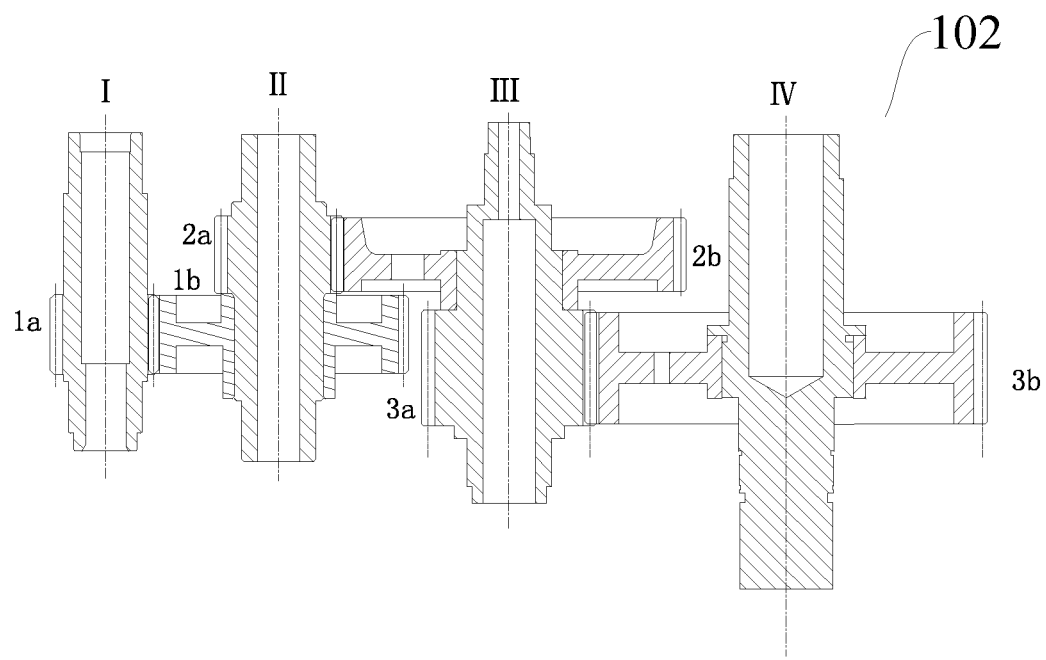
FIG. 3 is a cross-sectional view of a three-stage reducer according to embodiments of the present invention.

A power transmission system 10000 according to embodiments of the present invention will now be described with reference to FIG. 1 to FIG. 3. As shown in FIG. 1 to FIG. 3, the power transmission system 10000 according to embodiments of the present invention includes at least one power assembly 1000.

For example, in some embodiments, the power transmission system 10000 includes one power assembly 1000, and the power assembly 1000 is used for driving front wheels of a vehicle. It can be understood that the front wheels of the vehicle include a left front wheel H1 and a right front wheel H2, and the vehicle is a front-wheel drive vehicle.

In other embodiments, the power transmission system 10000 includes a power assembly 1000, and the power assembly 1000 is used for driving rear wheels of a vehicle. It will be understood that the rear wheels of the vehicle include a left rear wheel H3 and a right rear wheel H4, and the vehicle is a rear-wheel drive vehicle.

In some embodiments as shown in FIG. 1, the power transmission system 10000 includes two power assemblies 1000. One of the power assemblies 1000 is used for driving front wheels of a vehicle, and the other power assembly 1000 is used for driving rear wheels of the vehicle, that is, the vehicle is a four-wheel drive vehicle.

In some embodiments, in the four-wheel drive vehicle, the two power assemblies 1000 may be disposed in parallel, and the two power assemblies 1000 are spaced apart in the front-rear direction. Such an arrangement is convenient in assembly and simple in structure.

Further, the two power assemblies 1000 can be symmetrically disposed. The two power assemblies 1000 are spaced apart in the front-rear direction, and the symmetry axis is perpendicular to the front-rear direction. Such an arrangement is convenient for assembly and uniform in load distribution of the vehicle.

In some embodiments, in a four-wheel drive vehicle, two power assemblies 1000 are disposed such that one of the power assemblies 1000 is formed by rotating the other power assembly 1000 by 180° about an axis perpendicular to the front-rear direction. Such an arrangement is uniform in load distribution of the vehicle, good in structural symmetry, and easy for vehicle arrangement.

As shown in FIG. 1 to FIG. 3, the power assembly 1000 includes a first power component 100a and a second power component 100b. Taking the power assembly 1000 driving the front wheels of the vehicle as an example, the first power component 100a is used for driving the left front wheel H1, the second power component 100b is used for driving the right front wheel H2, the first power component 100a and the second power component 100b each includes a motor 101 and a transmission 102, and the transmission 102 is adapted to be connected between the motor 101 and the wheel on the corresponding side. Thus, each wheel can be driven separately, that is, each wheel corresponds to a motor 101 and a transmission 102 connected to the motor 101.

As shown in FIG. 2 and FIG. 3, the transmission 102 is a three-stage reducer. The three-stage reducer is used to reduce the speed of the motor 101 and increase the torque. The speed drop is divided into three levels of gradient. The strength load received by gears in the three-stage reducer is significantly lowered, so the gear life is ensured, and the durability of the entire three-stage reducer is enhanced. Further, as the speed ratio is lowered, the sliding friction between the meshing gears is lowered, so that the heat generated by the sliding friction is reduced, further prolonging the life of the gear.

As shown in FIG. 2 and FIG. 3, the three-stage reducer may include an input shaft I, a first intermediate shaft II, a second intermediate shaft III and an output shaft IV. The input shaft I is provided with a primary driving gear 1a, the input shaft I is connected to the motor 101, the first intermediate shaft II is provided with a primary driven gear 1b and a secondary driving gear 2a, the second intermediate shaft III is provided with a secondary driven gear 2b and a tertiary driving gear 3a, the output shaft IV is connected to the wheel on the corresponding side, and the output shaft IV is provided with a tertiary driven gear 3b. The primary driven gear 1b meshes with the primary driving gear 1a, the secondary driven gear 2b meshes with the secondary driving gear 2a, and the tertiary driven gear 3b meshes with the tertiary driving gear 3a, thereby transmitting the power output from the motor 101 sequentially from the input shaft I, the first intermediate shaft II, the second intermediate shaft III and the output shaft IV to the wheel, thereby driving the wheel to rotate.

In some embodiments, the primary driving gear 1a is integrally formed with the input shaft I, the secondary driving gear 2a is integrally formed with the first intermediate shaft II, and the tertiary driving gear 3a is integrally formed with the second intermediate shaft III, and thus, the three-stage reducer is simple in structure, low in cost and high in structural strength.

In some embodiments, as shown in FIG. 2, the secondary driving gear 2a and the secondary driven gear 2b are located on the side close to the motor 101, and the primary driving gear 1a, the primary driven gear 1b, the tertiary driving gear 3a and the tertiary driven gear 3b are located on the side away from the motor 101. Such an arrangement saves space of the vehicle in the left-right direction and saves space in the front-rear direction. At the same time, in such an arrangement, in the embodiment in which a locking device 200 is disposed between the two transmissions 102, the locking device 200 is convenient to mount and occupies less space, and the layout of the vehicle is reasonable.

In some embodiments, the speed ratio of the input shaft I to the output shaft IV of the three-stage reducer is 16-18. By setting the speed ratio within the above range, the motor 101 and the three-stage reducer are better matched, and the power output from the motor 101 is fully utilized.

In some embodiments, the first power component 100a and the second power component 100b of each power assembly 1000 are symmetrically disposed in the left-right direction, whereby the structural symmetry is good, the load distribution of the vehicle is uniform, which is beneficial to enhancement of the stability of the vehicle.

In short, in the power transmission system 10000 of the above embodiments, by setting the transmission 102 as a three-stage reducer, the design difficulty of the entire power transmission system 10000 can be lowered. The use of the three-stage reducer makes the motor 101 slowdown process more stable, which is beneficial to enhancement of the stability of the vehicle. The three-stage reducer has a simple structure and a long service life, and saves maintenance and replacement costs.

A vehicle according to embodiments of the present invention will be briefly described below. The vehicle includes the above-described power transmission system 10000, and thus, has a simple structure, a long practical life and a reasonable spatial layout.

A power transmission system 10000 according to embodiments of the present invention will be described below with reference to FIG. 1 to FIG. 15. As shown in FIG. 1 to FIG. 15, the power transmission system 10000 includes at least one power assembly 1000, and the power assembly 1000 includes a first power component 100a and a second power component 100b. The power transmission system 10000 can be used for driving front wheels of the vehicle and/or rear wheels of the vehicle.

The first power component 100a and the second power component 100b are symmetrically disposed in the left-right direction, whereby the structural symmetry is good, the arrangement is easy, and the arrangement space is saved.

The first power component 100a is used for driving a wheel on the left side, and the second power component 100b is used for driving a wheel on the right side. The first power component 100a and the second power component 100b each include a housing 103, and a motor 101 and a transmission 102 disposed in the housing 103, and the transmission 102 is adapted to be connected between the motor 101 and the wheel on the corresponding side.

Figure 4:
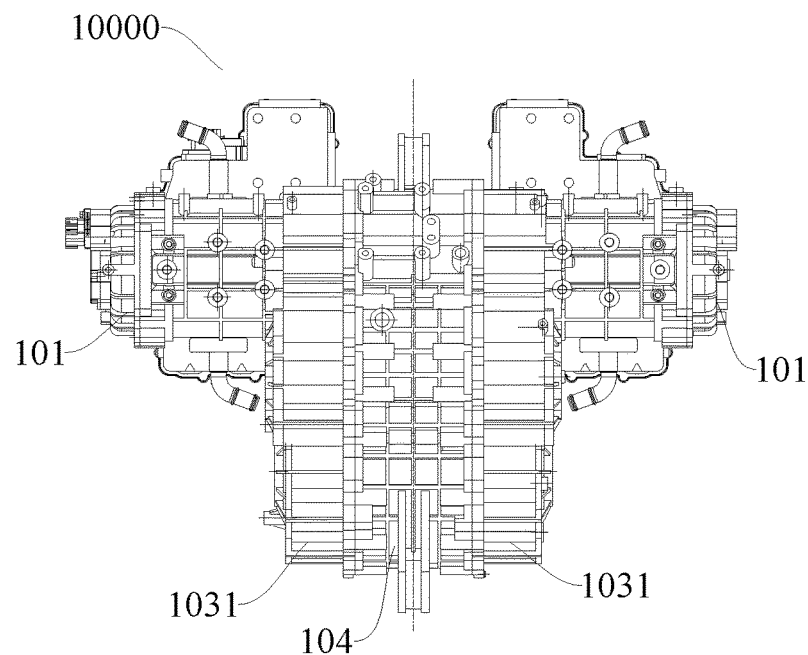
FIG. 4 is a schematic structural view of a power assembly according to embodiments of the present invention.
Figure 6:
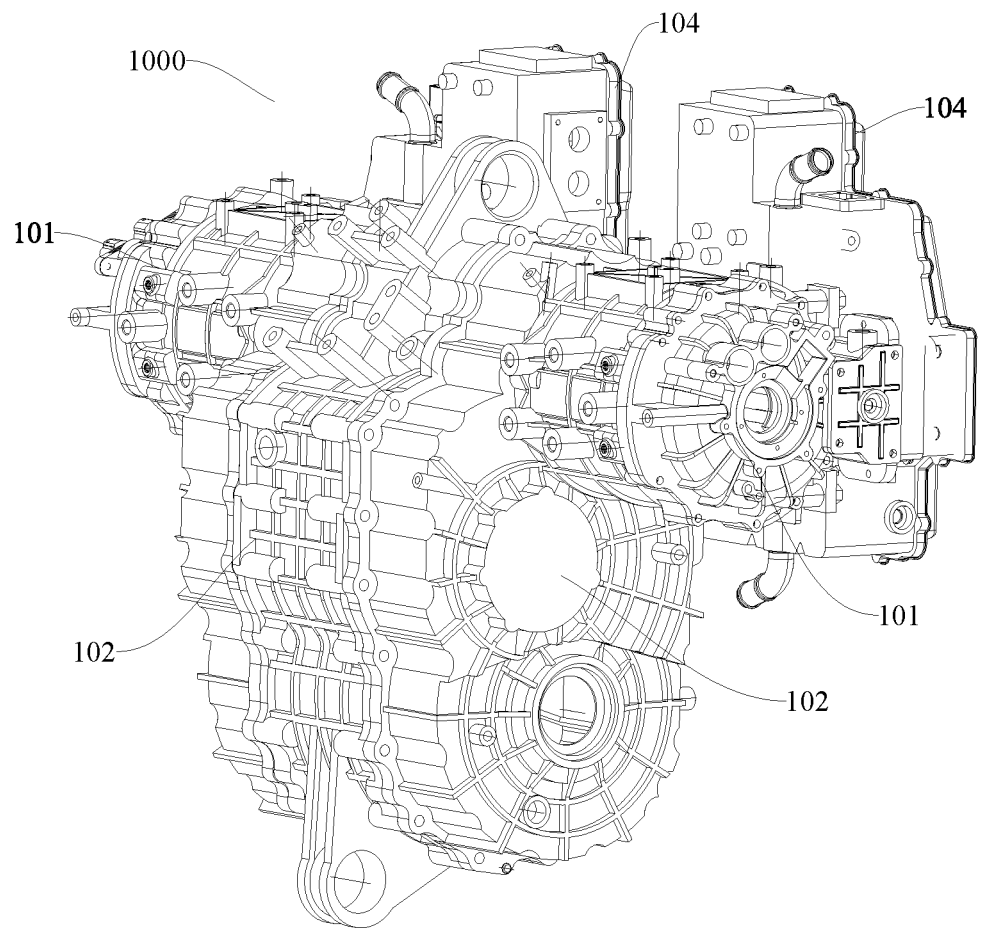
FIG. 6 is a three-dimensional schematic structural view of the power assembly according to embodiments of the present invention.

As shown in FIG. 4 and FIG. 6, the two housings 103 are connected to form an outer casing of the power assembly 1000. By connecting the two housings 103, the first power component 100a and the second power component 100b are connected together, so that the power assembly 1000 can be mounted or dismounted as a whole, and the space occupied by the power assembly 1000 is reduced.

In embodiments having two power assemblies 1000, the outer casings of the two power assemblies 1000 may be disposed in parallel. The two outer casings may also be symmetrically disposed in the front-rear direction, and the two power assemblies 1000 may symmetrically disposed in the front-rear direction with any angle therebetween. Preferably, the two outer casings may also be in a 180° relationship, that is, the two outer casings are disposed such that one of the outer casings is formed by rotating the other outer casing by about 180° about an axis perpendicular to the front-rear direction.

In short, in the power transmission system 10000 according to some embodiments of the present invention, by connecting the two housings 103 of the two power components of the same power assembly 1000, the power assembly 1000 is compact in structure, occupies less space and is convenient to mount and dismount.

Some embodiments of the outer casing of the power assembly 1000 are briefly described below.

In some embodiments, each of the housings 103 may include a first housing 1031 and a second housing 1032. One end of the first housing 1031 is open, and the second housing 1032 is disposed at the open end of the first housing 1031. A mounting space for the motor 101 and the transmission 102 is defined between the first housing 1031 and the second housing 1032. Optionally, the first housing 1031 and the second housing 1032 may be detachably connected by a threaded connecting piece, thereby facilitating the mounting of the motor 101 and the transmission 102. The two second housings 1032 of the power assembly 1000 are connected to achieve the connection of the two housings 103.

Figure 5:
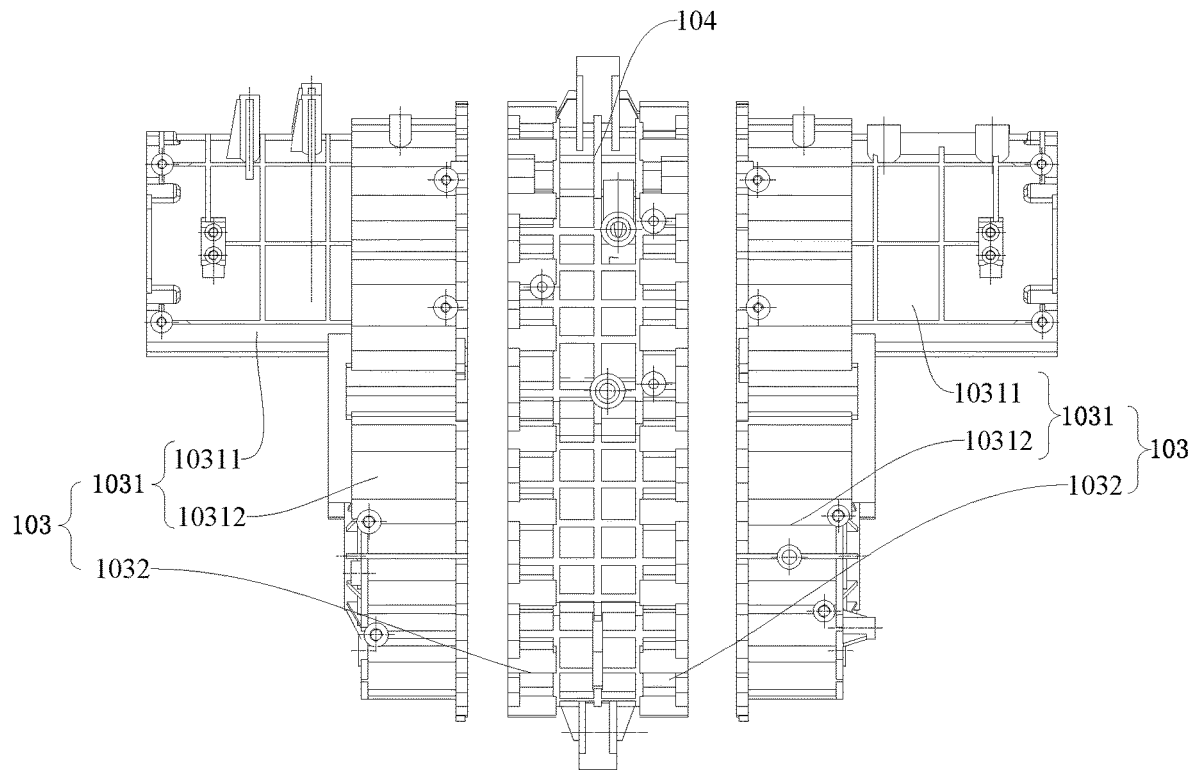
FIG. 5 is an exploded schematic structural view of a housing of the power assembly according to embodiments of the present invention.

In some embodiments, as shown in FIG. 5, the two second housings 1032 are integrally formed into an intermediate housing 104, so that the outer casing is composed of three parts. Thus, the structure is simple, the development cost is saved, and moreover the space is saved.

In other embodiments, the end surfaces of the two second housings 1032 facing each other are in contact with each other, so that each second housing 1032 is simple in structure and easy to process, and the mounting and dismounting of each power component does not affect the other power component. At the same time, such an arrangement can also save space.

In one embodiment as shown in FIG. 5, one of the first housing 1031 and the second housing 1032 of the same power component includes a motor housing 10311 and a first sub-transmission housing 10312, the motor housing 10311 and the first sub-transmission housing 10312 are integrally formed, and the motor 101 is disposed in the motor housing 10311. The other of the first housing 1031 and the second housing 1032 of the same power component is a second sub-transmission housing, the first sub-transmission housing 10312 and the second sub-transmission housing are connected and jointly define an accommodating space, and the transmission 102 is disposed in the accommodating space.

Further, as shown in FIG. 5, the motor housing 10311 is disposed on an end surface of the first sub-transmission housing 10312 away from the second sub-transmission housing. Still further, the motor housing 10311 and the first sub-transmission housing 10312 are integrally formed in an "L" shape, and this structure makes the structure of the first housing 1031 or the second housing 1032 more compact.

As shown in FIG. 4 and FIG. 5, the two housings 103 are connected to form a "T"-shaped structure, so the structure is compact, and the occupied space is small. Specifically, the motor housing 10311 is located outside the corresponding first sub-transmission housing 10312, and the second sub-transmission housing is located inside the corresponding first sub-transmission housing 10312. That is, in the left-right direction of the vehicle, two transmissions 102 are disposed in the middle of the two motors 101, and the motor housing 10311 is located at the front or the rear of the first sub-transmission 102.

Such a "T"-shaped structure arrangement makes the occupied space of the outer casing small, and the outer casing is regular in appearance, convenient for arrangement on the vehicle, and cannot waste space.

As shown in FIG. 6, the motor housing 10311 may be provided with a motor controller.

In some embodiments, taking the first housing 1031 including a motor housing 10311 and a first sub-transmission housing 10312, the second housing 1032 being a second sub-transmission housing, the two second housings 1032 being integrally formed into an intermediate housing 104 and the transmission 102 being a three-stage reducer as an example, the housing 103 of the three-stage reducer is described in detail.

Figure 7:
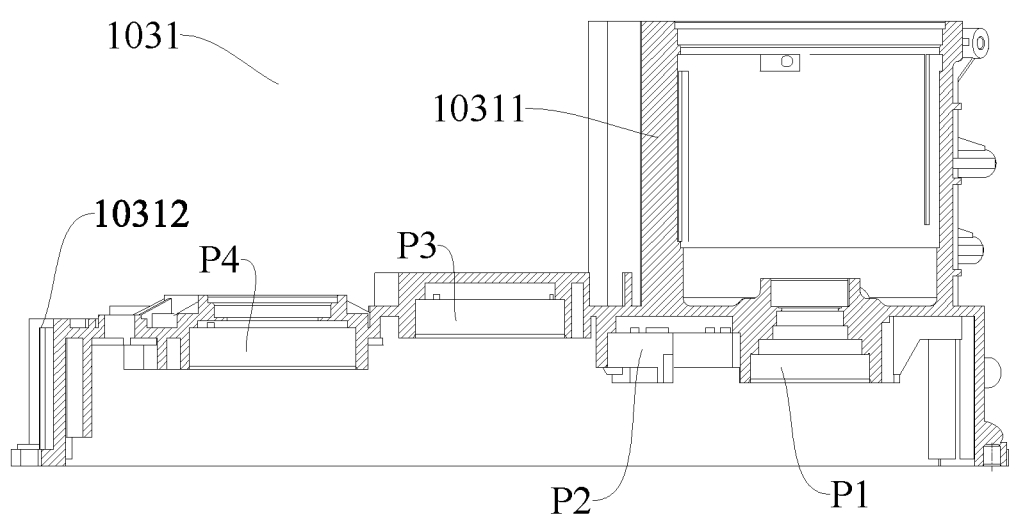
FIG. 7 is a cross-sectional view of a first housing according to embodiments of the present invention.
Figure 8:
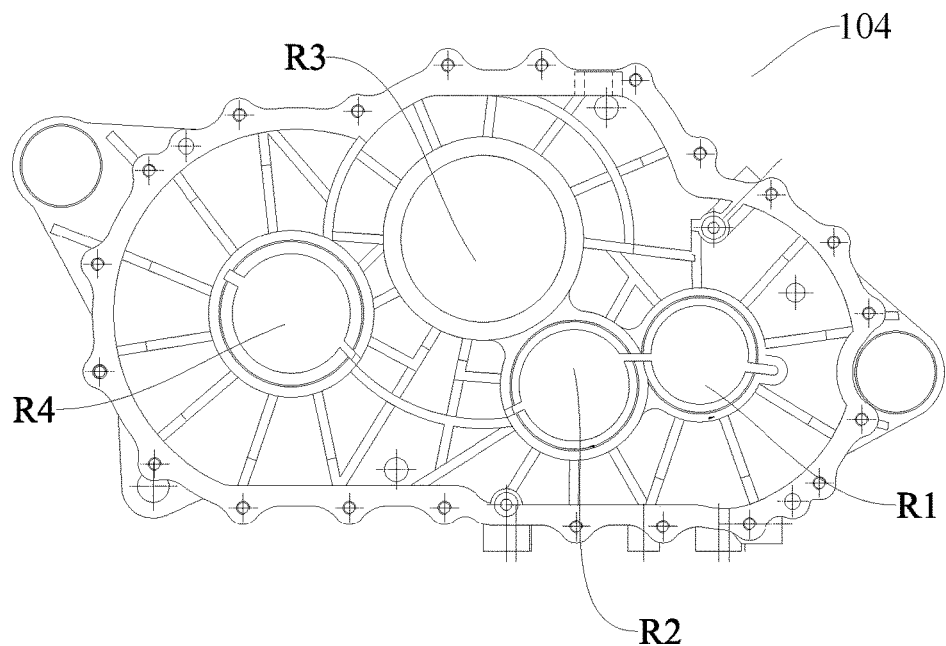
FIG. 8 is a side view of an intermediate housing according to an embodiment of the present invention.

As shown in FIG. 7, the first sub-transmission housing 10312 is provided with an input shaft mounting hole P1, a first intermediate shaft mounting hole P2, a second intermediate shaft mounting hole P3 and an output shaft mounting hole P4. As shown in FIG. 8, FIG. 9, FIG. 12 and FIG. 13, the intermediate housing 104 is provided with two first mounting holes R1, two second mounting holes R2, two third mounting holes R3 and two fourth mounting holes R4.

One end of the input shaft I is mounted in the input shaft mounting hole P1, and the other end of the input shaft I is mounted in the first mounting hole R1. One end of the first intermediate shaft II is mounted in the first intermediate shaft mounting hole P2, and the other end of the first intermediate shaft II is installed in the second mounting hole R2. One end of the second intermediate shaft III is mounted in the second intermediate shaft mounting hole P3, and the other end of the second intermediate shaft III is mounted in the third mounting hole R3. One end of the output shaft IV is mounted in the output shaft mounting hole P4, and the other end of the output shaft IV is mounted in the fourth mounting hole R4.

In one embodiment of a power transmission system 10000 of the present invention, no locking device 200 is disposed between the first power component 100a and the second power component 100b of the same power assembly 1000. That is, in this embodiment, the first power component 100a and the second power component 100b can operate independently without affecting each other.

Figure 9:
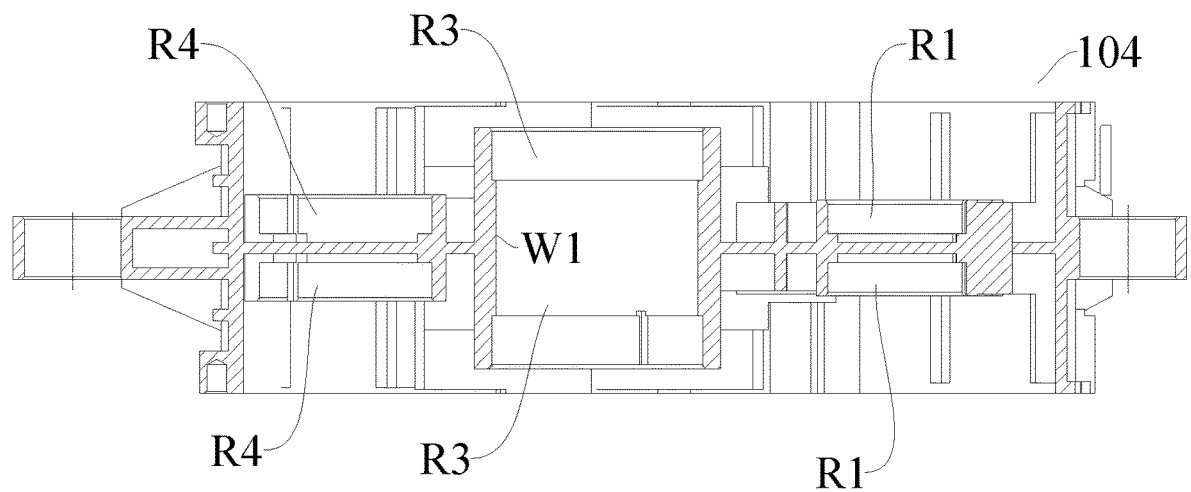
FIG. 9 is a cross-sectional view of the intermediate housing of FIG. 8.
Figure 10:
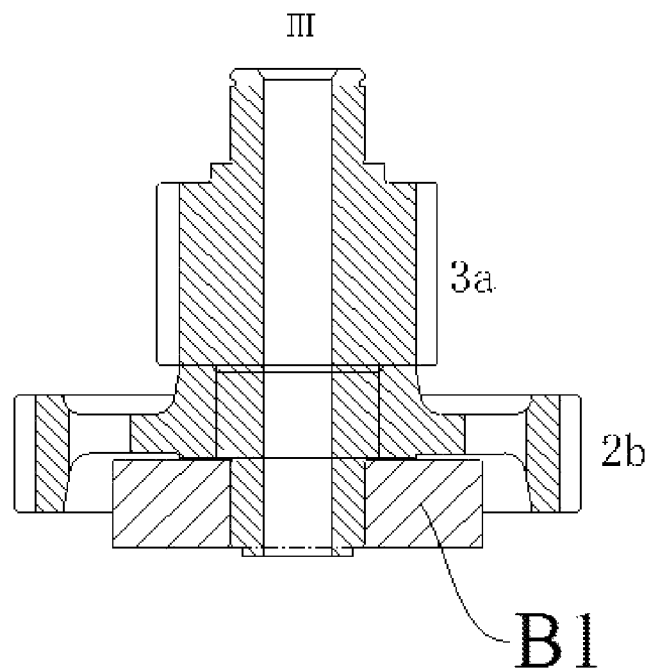
FIG. 10 is a schematic structural view of a second intermediate shaft matched with the intermediate housing of FIG. 8.
Figure 11:
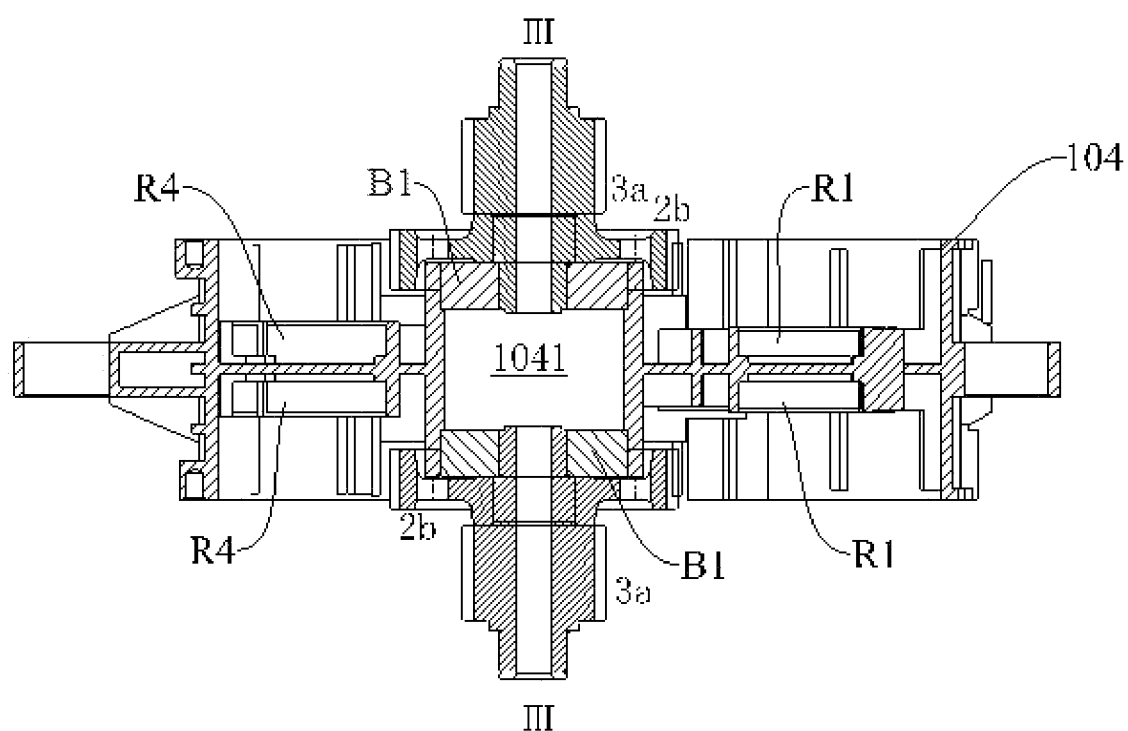
FIG. 11 is a cross-sectional view of the intermediate housing of FIG. 8 matched with the second intermediate shaft of FIG. 10.
Figure 12:
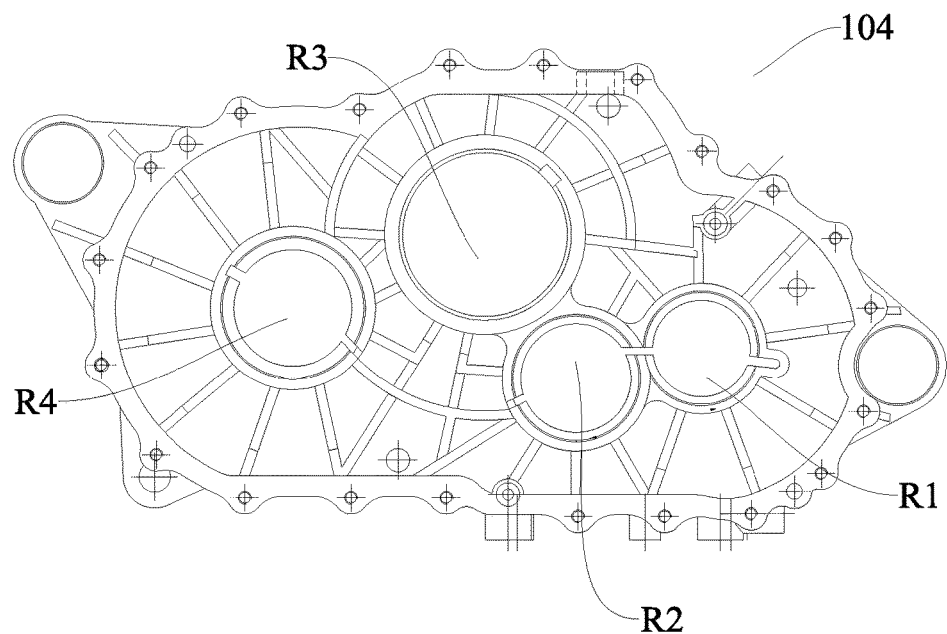
FIG. 12 is a side view of an intermediate housing according to an embodiment of the present invention.

For the power assembly 1000 in which no locking device 200 is provided, the structure of the housing 103 and the transmission 102 is shown in FIG. 7 to FIG. 10, wherein as shown in FIG. 9, two third mounting holes R3 are in communication, and the inner wall surface W1 of the third mounting hole R3 does not require machining treatment. As shown in FIG. 10, the other end of the second intermediate shaft III corresponding to the third mounting hole R3 is supported in the third mounting hole R3 through the bearing B1, and the end surface of the other end of the second intermediate shaft III is substantially flush with the end surface of the bearing.

In one embodiment of a power transmission system 10000 of the present invention, a locking device 200 is disposed between the first power component 100a and the second power component 100b of the same power assembly 1000. The first power component 100a and the second power component 100*b* of the same power assembly 1000 are connected by the locking device 200 to be selectively synchronized, that is, when the first power component 100*a* and the second power component 100*b* are locked, the wheel driven by the first power component 100*a* can be rotated synchronously with the wheel driven by the second power component 100*b*.

In this embodiment, the first power component 100*a* and the second power component 100*b* can work independently without affecting each other, and the first power component 100*a* and the second power component 100*b* can also work synchronously such that the gears on the left and right sides rotate synchronously to facilitate the vehicle to escape when the wheel on one side slips.

Figure 13:
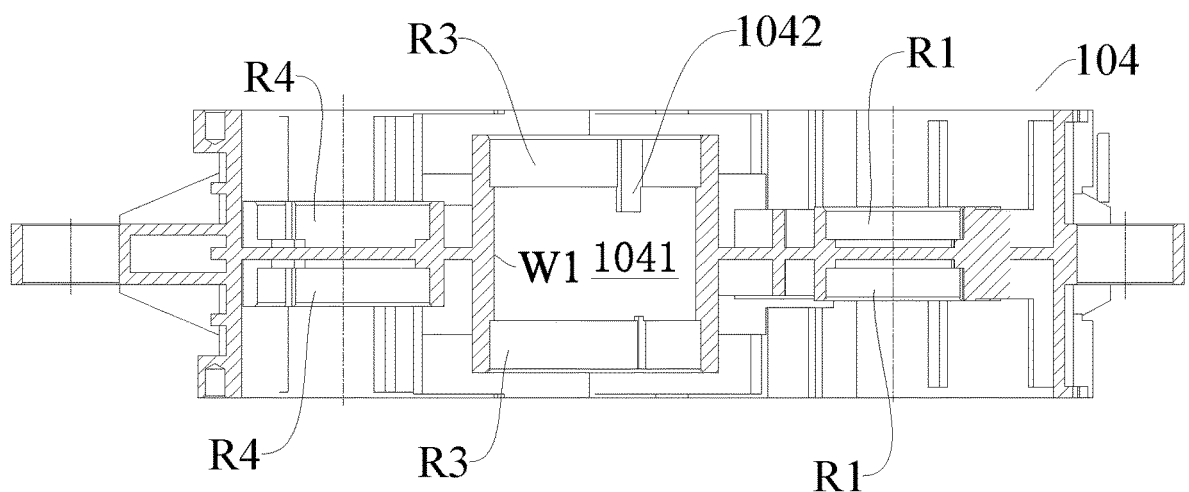
FIG. 13 is a cross-sectional view of the intermediate housing of FIG. 12.
Figure 14:
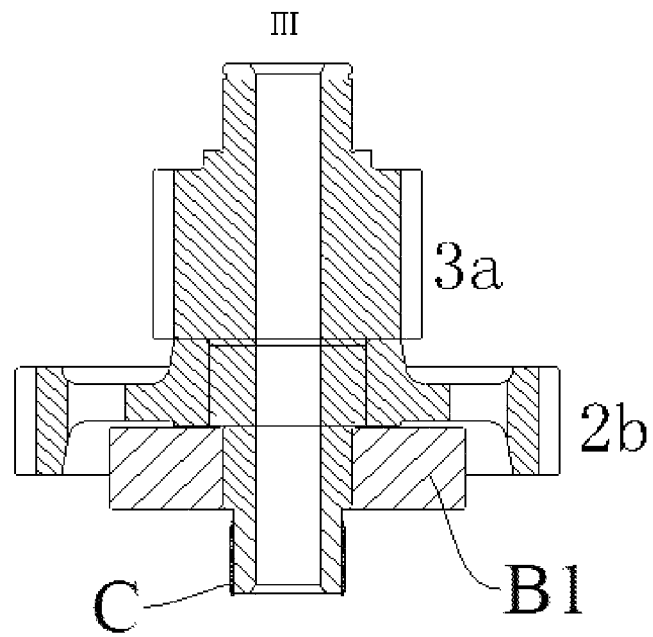
FIG. 14 is a schematic structural view of a second intermediate shaft matched with the intermediate housing of FIG. 12.

For the power assembly 1000 in which the locking device 200 is provided, the structure of the housing 103 and the transmission 102 is shown in FIG. 7 to FIG. 10. As shown in FIG. 13, the intermediate housing 104 defines an accommodating cavity 1041, the locking device 200 is disposed in the accommodating cavity 1041, the two third mounting holes R3 are in communication and jointly define the accommodating cavity 1041, and the inner wall surface W1 of the third mounting hole R3 requires machining treatment. As shown in FIG. 14, the other end of the second intermediate shaft III corresponding to the third mounting hole R3 is supported in the third mounting hole R3 through the bearing B1. The other end of the second intermediate shaft III passes through the bearing B1 and extends beyond the bearing B1, and the excess portion is provided with a locking device connecting portion C. The locking device connecting portion C is used to be connected to the locking device 200. In a specific embodiment, the locking device connecting portion C is used to be connected to the locking device 200 through a splined structure.

Some embodiments of the power transmission system 10000 according to the present invention are briefly described below. In these embodiments, the power transmission system 10000 includes a locking device 200 and at least one power assembly 1000.

The power assembly 1000 includes a first power component 100*a* and a second power component 100*b*, and the first power component 100*a* and the second power component 100*b* are symmetrically disposed in the left-right direction. The first power component 100*a* is used for driving a wheel on the left side, and the second power component 100*b* is used for driving a wheel on the right side. The first power component 100*a* and the second power component 100*b* each include a housing 103, and a motor 101 and a transmission 102 disposed in the housing 103, and the transmission 102 is adapted to be connected between the motor 101 and the wheel on the corresponding side.

As shown in FIG. 12 to FIG. 15, the two housings 103 are connected and the connecting portion of the two housings 103 defines an accommodating cavity 1041. The locking device 200 is disposed in the accommodating cavity 1041, wherein the first power component 100*a* and the second power component 100*b* are connected by the locking device 200 for selective synchronization.

Thereby, the power assembly 1000 thus has two operating states, an unlocked state and a locked state. When the power assembly 1000 is in the locked state, the first power component 100*a* and the second power component 100*b* are synchronized by the locking device 200, so that the wheel driven by the first power component 100*a* rotates synchronously with the wheel driven by the second power component 100*b*. When the power assembly 1000 is in the unlocked state, the first power component 100*a* and the second power component 100*b* are independent of each other.

When the wheel on one side slips, the locking device 200 synchronizes the first power component 100*a* and the second power component 100*b*, thereby outputting the power of the power component corresponding to the wheel which does not slip to the wheel on the slip side through the locking device 200 to realize power driving, which helps the vehicle to escape.

When the power component on one side is damaged or fails, the locking device 200 synchronizes the first power component 100*a* and the second power component 100*b*, thereby outputting the power of the normally working power component to the power component on the other side through the locking device 200 so as to drive the wheel on this side and realize power driving, so the use is more convenient.

According to the power transmission system 10000 of embodiments of the present invention, by providing the locking device 200, the maximum power transmission advantage of the power transmission system 10000 can be exerted, and the power of the vehicle is enhanced, which is beneficial to escape at the time of slipping. When the power component on one side is damaged, the vehicle can still be normally driven.

The power transmission system 10000 has two power assemblies 1000, and the two power assemblies 1000 respectively drive the front wheels of the vehicle and the rear wheels of the vehicle.

In some embodiments, the quantity of the locking devices 200 may be one, so that the first power component 100*a* and the second power component 100*b* of one of the two power assemblies 1000 are connected by the locking device 200 for selective synchronization. Thus, in the front-wheel drive power assembly 1000 and the rear-wheel drive power assembly 1000, the power assembly 1000 provided with the locking device 200 is good in power performance and strong in ability to escape.

In some embodiments, the quantity of the locking devices 200 may be two, so that the first power component 100*a* and the second power component 100*b* of each of the power assemblies 1000 are connected by one locking device 200 for selective synchronization. Thus, the front-wheel drive power assembly 1000 and the rear-wheel drive power assembly 1000 have good power performance and strong ability to escape.

In this embodiment, the locking device 200 is disposed between the two transmissions 102 such that the two transmissions 102 are connected by the locking device 200 for selective synchronization.

In the embodiment in which the transmission 102 is a three-stage reducer, the two second intermediate shafts III are connected by a locking device 200 for selective synchronization. The locking device 200 is arranged between the two second intermediate shafts III. The rotational speeds of the two shafts that need to be synchronized of the locking device 200 are moderate, the locking device 200 does not interfere with the gears of the three-stage reducer, and the occupied space is small, so the internal layout of the power assembly 1000 is more reasonable.

Figure 15:
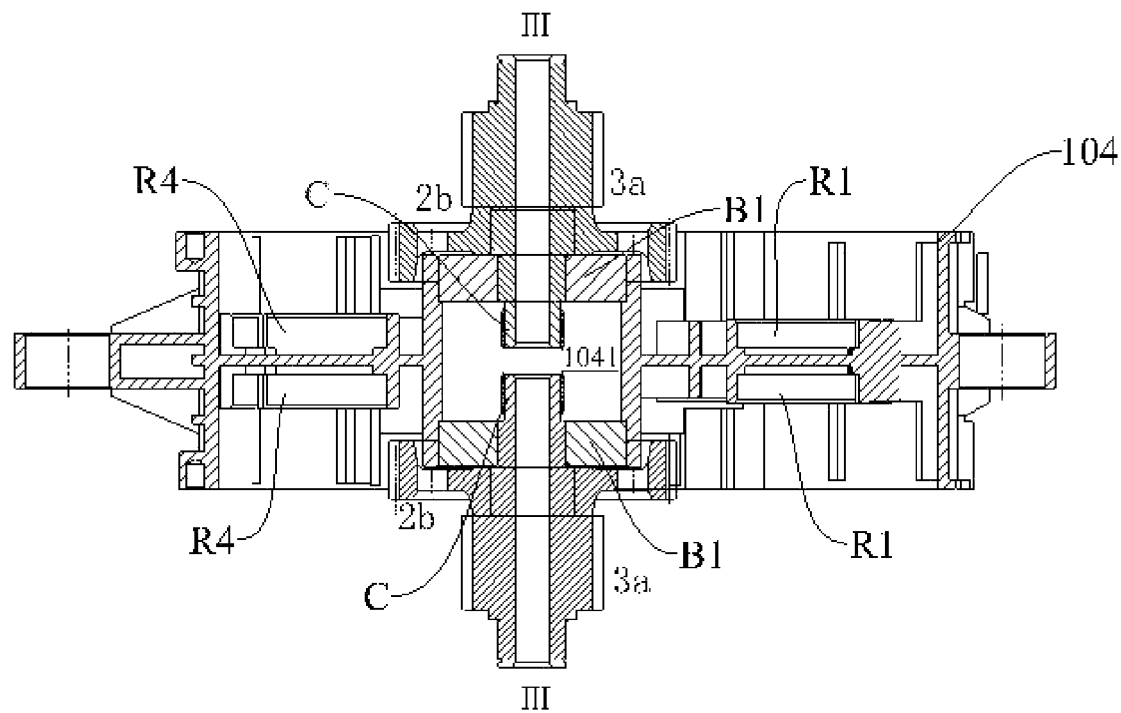
FIG. 15 is a cross-sectional view of the intermediate housing of FIG. 12 matched with the second intermediate shaft of FIG. 14.

As shown in FIG. 13 and FIG. 15, the second sub-transmission housing of the first power component 100*a* and the second sub-transmission housing of the second power component 100*b* are connected and jointly define an accommodating cavity 1041, and the locking device 200 is disposed in the accommodating cavity 1041. More specifically, the two second sub-transmission housings are integrally formed into an intermediate housing 104, the intermediate housing 104 is provided with two third mounting holes R3 in one-to-one correspondence with the second intermediate shaft III of the three-stage reducer, and the two third mounting holes R3 are in communication with each other and jointly define the accommodating cavity 1041.

A locking device 200 according to the present invention will now be described with reference to FIG. 16 to FIG. 19 below. The locking device 200 shown in FIG. 16 to FIG. 19 is a one-way locking device 200a. As shown in FIG. 16 to FIG. 19, the locking device 200 includes a first flange 201a, a second flange 201b, a synchronizing ring 202 and a driving component 203.

The first flange 201a is adapted to be fixed on the first shaft X1, the second flange 201b is adapted to be fixed on the second shaft X2, and the synchronizing ring 202 is normally connected to the first flange 201a to be adapted to rotate synchronously with the first flange 201a, that is, the synchronizing ring 202 is always in a connected state with the first flange 201a, and when the first flange 201a rotates, the synchronizing ring 202 rotates with the first flange 201a, the synchronizing ring 202 is slidable relative to the first flange 201a, and the synchronizing ring 202 is slidable relative to the first flange 201a in the axial direction of the first flange 201a.

The driving component 203 selectively pushes the synchronizing ring 202 to slide from an unlocked position to a locked position in an axial direction of the first flange 201a. When the synchronizing ring 202 is in the locked position, the synchronizing ring 202 is connected to the second flange 201b to be adapted to rotate the second flange 201b synchronously with the first flange 201a. When the synchronizing ring 202 is in the unlocked position, the synchronizing ring 202 is separated from the second flange 201b.

That is, the synchronizing ring 202 moves in the axial direction of the first flange 201a relative to the first flange 201a under the pushing of the driving component 203. When the synchronizing ring 202 is in the locked position, the synchronizing ring 202 is connected to the first flange 201a, and the synchronizing ring 202 is also connected to the second flange 201b, so that the first flange 201a drives the second flange 201b to rotate synchronously through the synchronizing ring 202 to realize power transmission. When the synchronizing ring 202 is in the unlocked position, the synchronizing ring 202 is connected to the first flange 201a, and the synchronizing ring 202 is separated from the second flange 201b such that the first flange 201a and the second flange 201b both rotate independently.

The locking device 200 according to embodiments of the present invention can realize one-way locking, and thus, has a simple structure, a less occupied space, an easy arrangement and a low failure rate. After locking, the locking device can exert the maximum power transmission advantage of the transmission system, and enhance the power performance of the vehicle, which is beneficial to escape when the wheel slips.

In one embodiment of the present invention, the driving component 203 includes an electromagnet 2031, an ejector pin 2032 and a driving member 2033. The electromagnet 2031 is adapted to be fixed on the housing 103. As shown in FIG. 13, the housing 103 is provided with a latching structure 1042. The electromagnet 2031 is connected to the housing 103 through the latching structure 1042. Specifically, the electromagnet 2031 is latched to the intermediate housing 104.

One end of the ejector pin 2032 is slidably connected to the first flange 201a, the first flange 201a is provided with a through hole D, and the ejector pin 2032 is slidably disposed in the through hole D.

The driving member 2033 is provided with a driving profile S, and the other end of the ejector pin 2032 is matched with the driving profile S. Specifically, the end surface of the other end of the ejector pin 2032 always abuts against the driving profile S.

The electromagnet 2031 is selectively energized. When the electromagnet 2031 is energized, the driving member 2033 is fixed. Due to the rotation of the first flange 201a, the driving member 2033 drives the ejector pin 2032 to move in the axial direction of the first flange 201a through the driving profile S and pushes the synchronizing ring 202 to slide from the unlocked position to the locked position.

In some embodiments, the ejector pin 2032 and the driving profile S are multiple and in one-to-one correspondence, and the multiple ejector pins 2032 are spaced apart in the circumferential direction of the first flange 201a. In some specific examples of the present invention, the quantities of the ejector pin 2032 and the driving profile S are each three.

Figure 16:
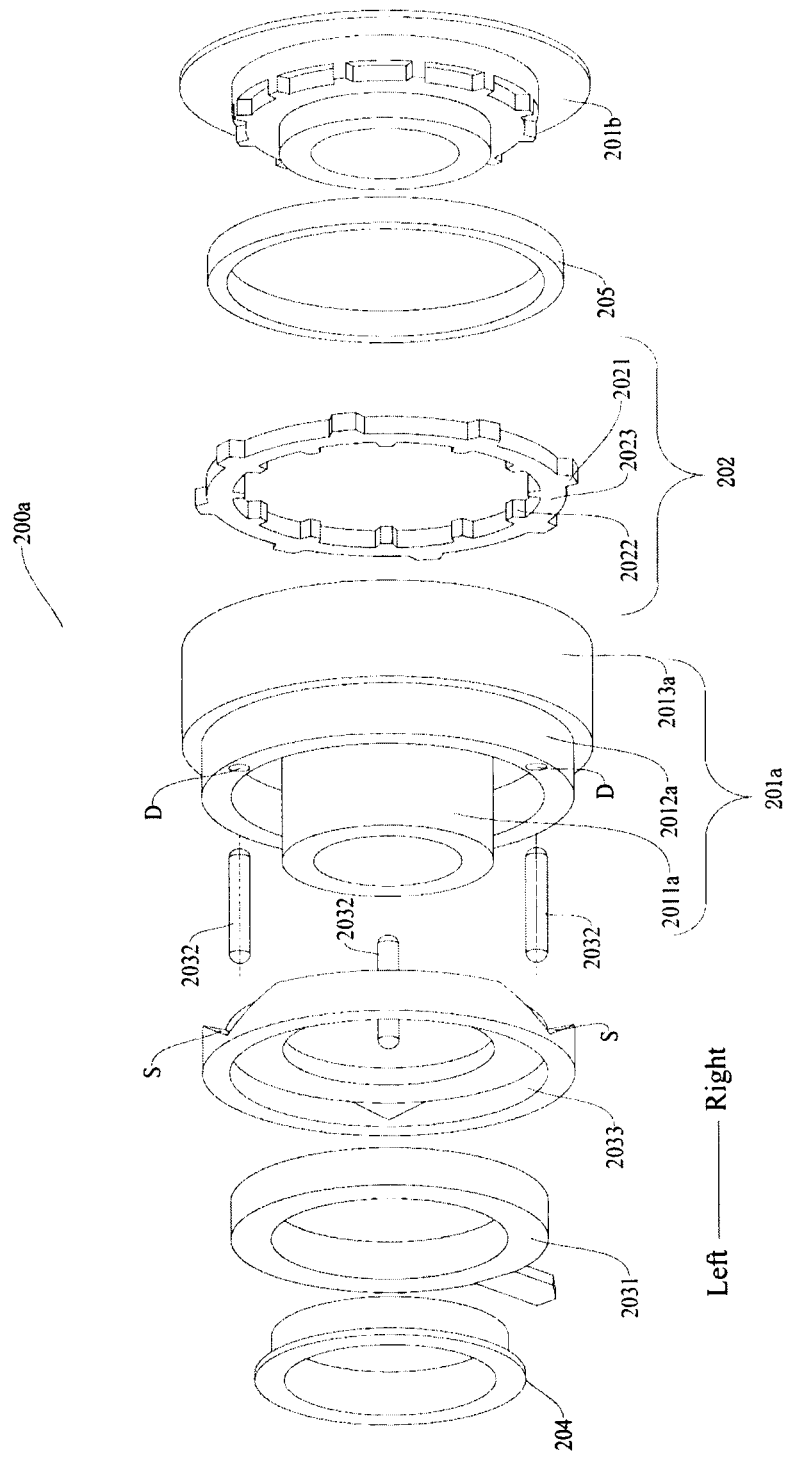
FIG. 16 is an exploded view of a one-way locking device from a first viewing angle.

In some embodiments, the driving profile S is a V-shaped profile, which is simple in shape and easy to manufacture. As shown in FIG. 16, in the axial direction of the first flange 201a, the opening of the V-shaped profile increases from one end away from the second flange 201b to one end near the second flange 201b.

Further, in the axial direction of the first flange 201a, a side wall of the V-shaped profile extends along a straight line or an arc from one end away from the second flange 201b to one end near the second flange 201b.

The locking device 200 may further include a bushing 204. The bushing 204 is sleeved over and fixed on the first flange 201a, and in the axial direction of the first flange 201a, the electromagnet 2031 is sandwiched between the bushing 204 and the housing 103. Therefore, the fixing of the electromagnet 2031 is stronger, and the reliability of the locking device 200 is higher.

The locking device 200 may further include an elastic return member 205, and the elastic return member 205 is connected to the second flange 201b and located between the synchronizing ring 202 and the second flange 201b in the axial direction of the first flange 201a. During the movement of the synchronizing ring 202 from the unlocked position to the locked position, the elastic return member 205 is compressed. When the electromagnet 2031 is de-energized, the elastic return member 205 pushes the synchronizing ring 202 to slide from the locked position to the unlocked position.

In some embodiments, the elastic return member 205 is a wave spring, whereby the contact area of the elastic return member 205 and the second flange 201b is large, and the contact area of the elastic return member 205 and the synchronizing ring 202 is large, so the force on the synchronizing ring 202 is more uniform.

The first flange 201a includes a fixing sleeve, a mounting sleeve and a guiding sleeve. The fixing sleeve is sleeved over and fixed on the first shaft X1, and the electromagnet 2031 and the driving member 2033 are sleeved over the fixing sleeve. The mounting sleeve is provided with a through hole D extending through the mounting sleeve in the axial direction of the first flange 201a, and the ejector pin 2032 is slidably disposed in the through hole D. The guiding sleeve is provided with a guiding groove, and the ejector pin 2032 is slidably disposed in the guiding groove. The guiding groove and the through hole D can ensure the movement track of the ejector pin 2032.

In the axial direction of the first flange 201a, the fixing sleeve, the mounting sleeve and the guiding sleeve are sequentially connected and the distance to the second flange 201b is decreased.

In the embodiment shown in FIG. 16 to FIG. 19, in the radial direction of the first flange 201a, the fixing sleeve, the mounting sleeve and the guiding sleeve are disposed sequentially from the inside to the outside, that is, in the radial direction of the first flange 201a, the distance from the fixing sleeve, the mounting sleeve and the guiding sleeve to the first shaft X1 is sequentially decreased.

Figure 17:
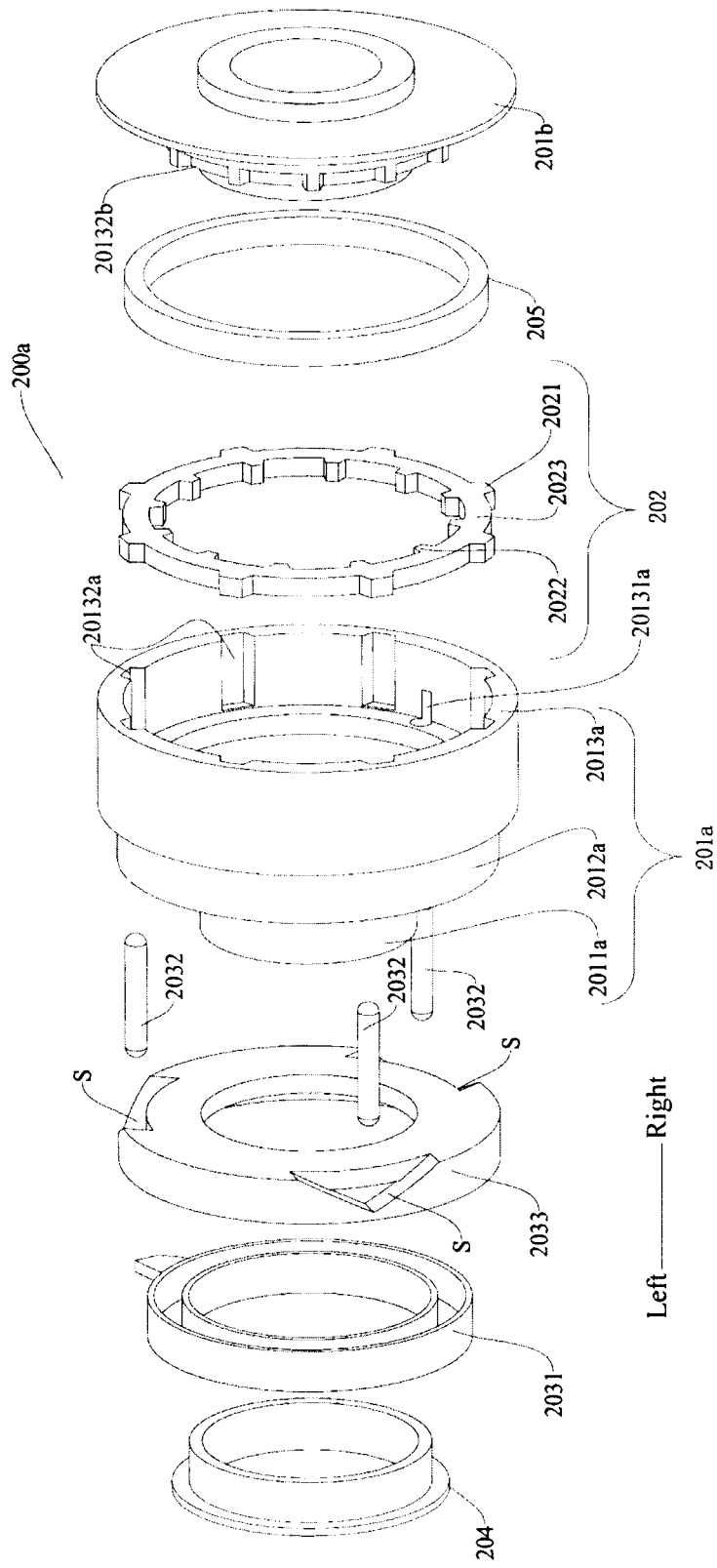
FIG. 17 is an exploded view of the one-way locking device from a second viewing angle.
Figure 18:
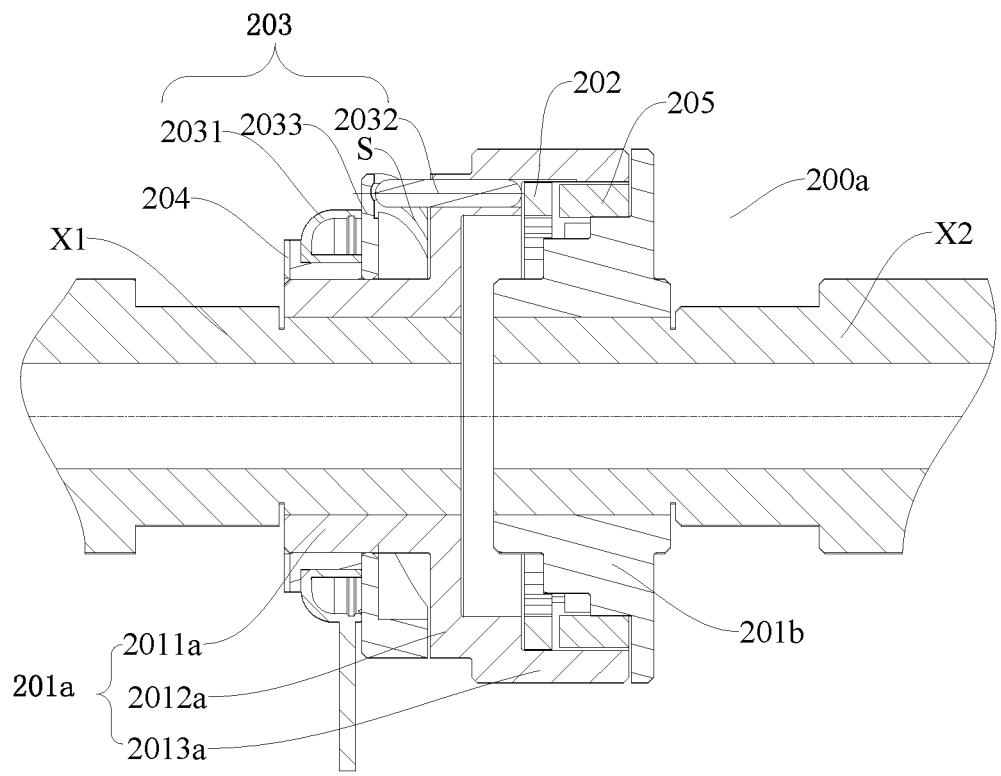
FIG. 18 is a cross-sectional view of the one-way locking device when unlocked.
Figure 19:
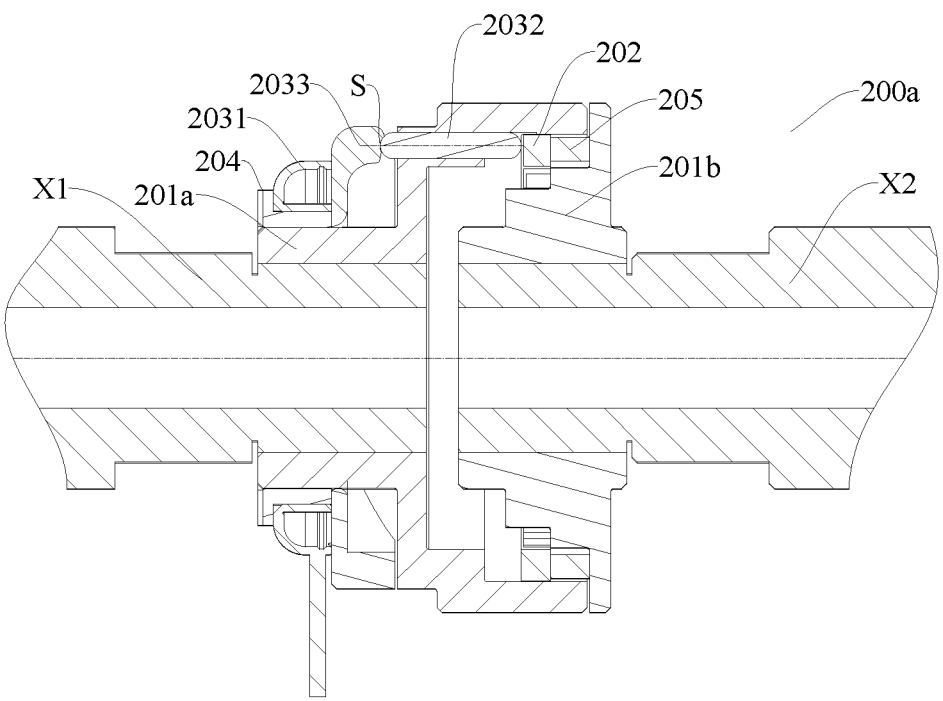
FIG. 19 is a cross-sectional view of the one-way locking device when locked.
Figure 20:
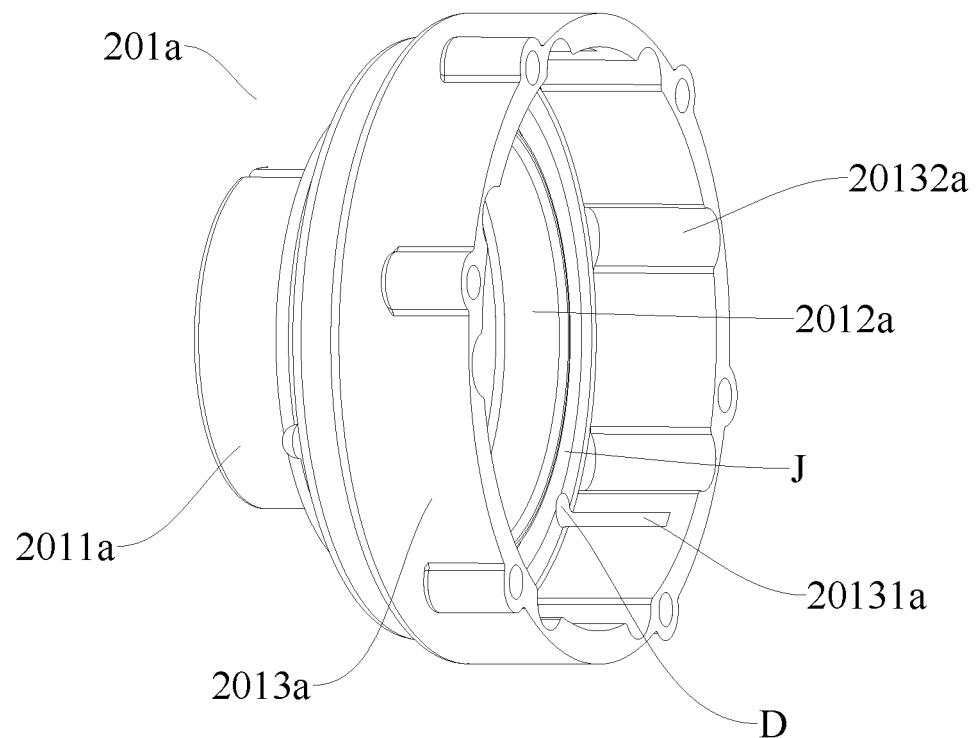
FIG. 20 is a schematic structural view of a first flange.
Figure 21:
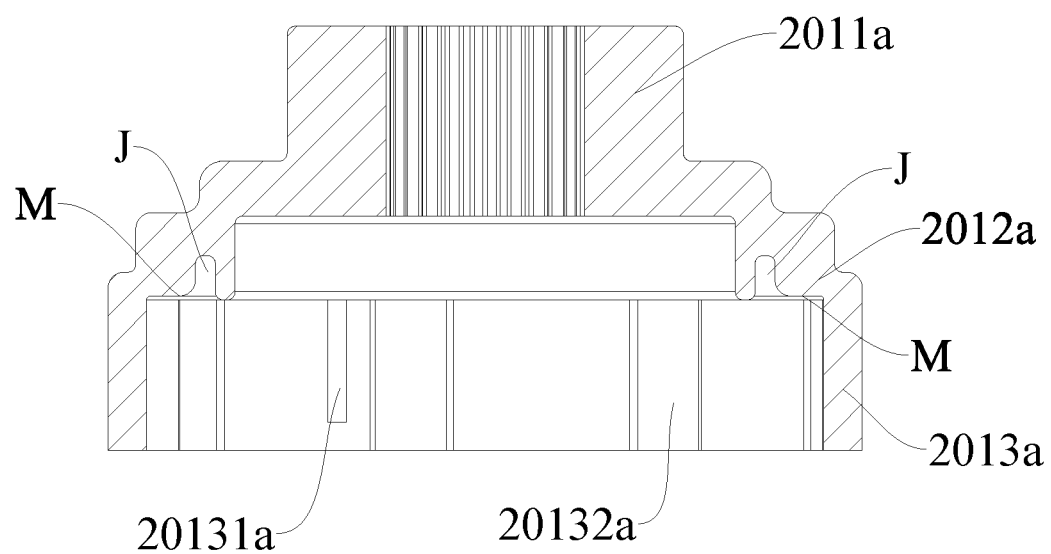
FIG. 21 is a cross-sectional view of the first flange.
Figure 22:
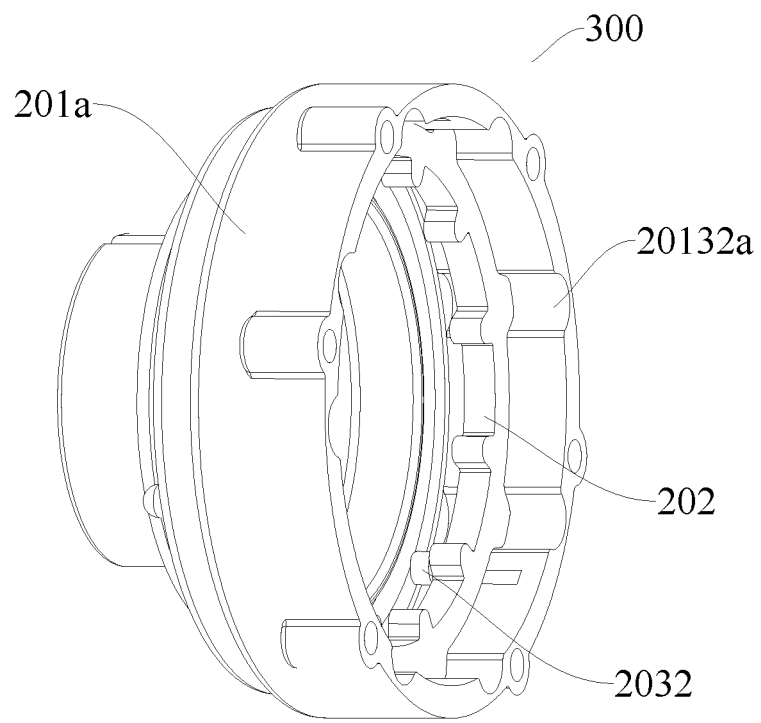
FIG. 22 is a schematic structural view of the first flange matched with a synchronizing ring.
Figure 23:
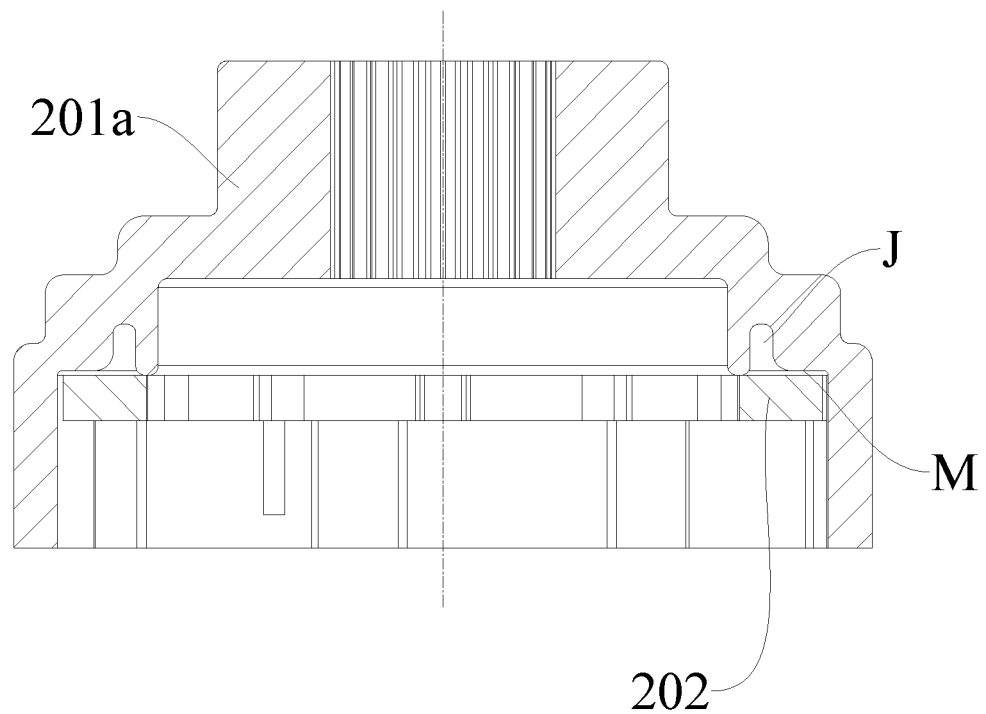
FIG. 23 is a cross-sectional view of the first flange matched with the synchronizing ring when the locking device is unlocked.
Figure 24:
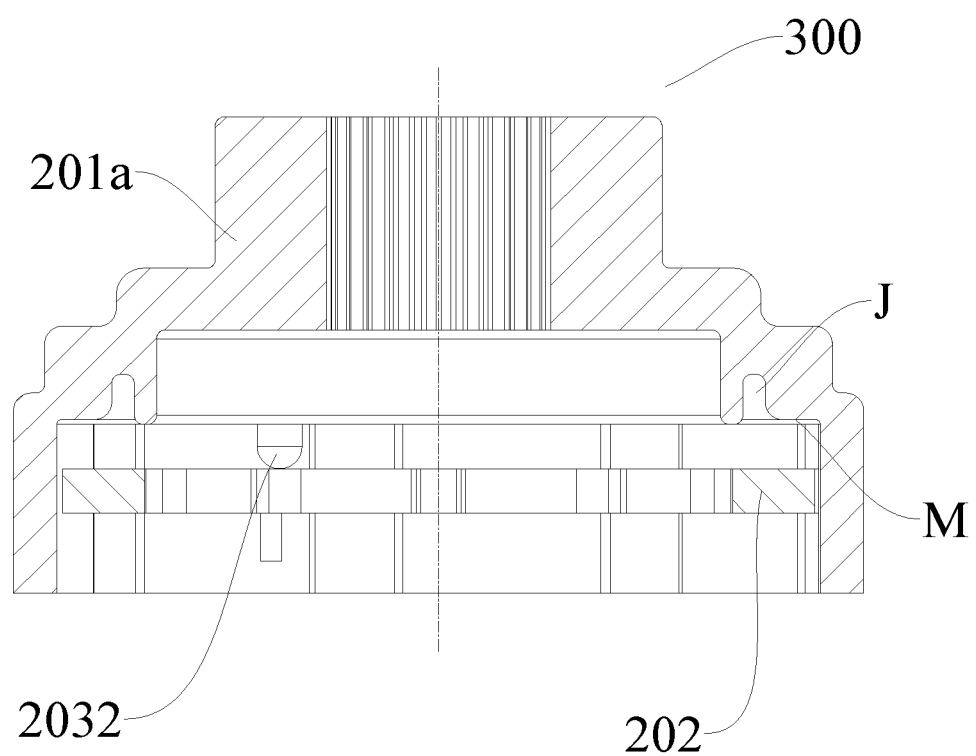
FIG. 24 is a cross-sectional view of the first flange matched with the synchronizing ring when the locking device is locked.
Figure 25:
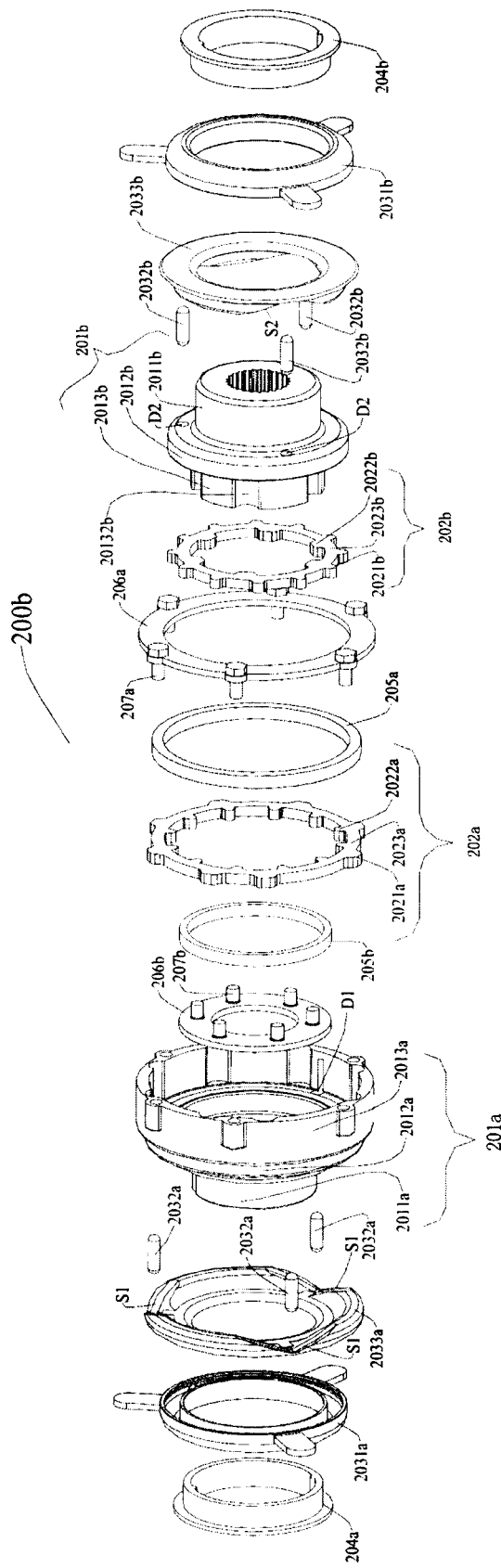
FIG. 25 is an exploded view of a two-way locking device from a first viewing angle.
Figure 26:
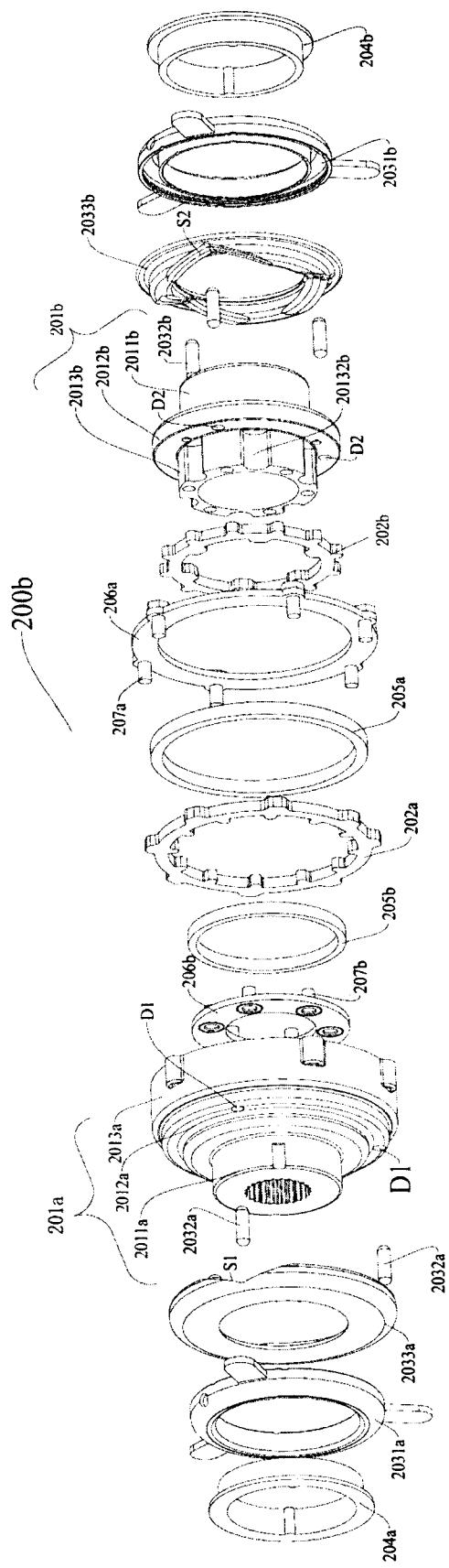
FIG. 26 is an exploded view of the two-way locking device from a second viewing angle.
Figure 27:
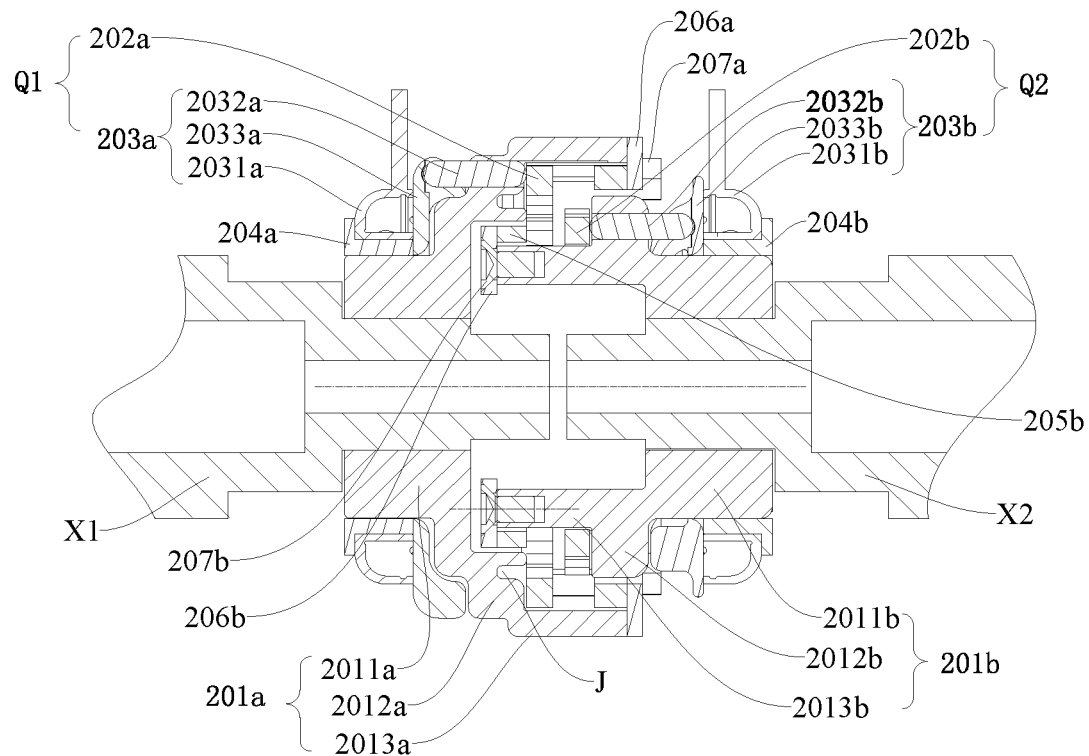
FIG. 27 is a cross-sectional view when the two-way locking device is unlocked.
Figure 28:
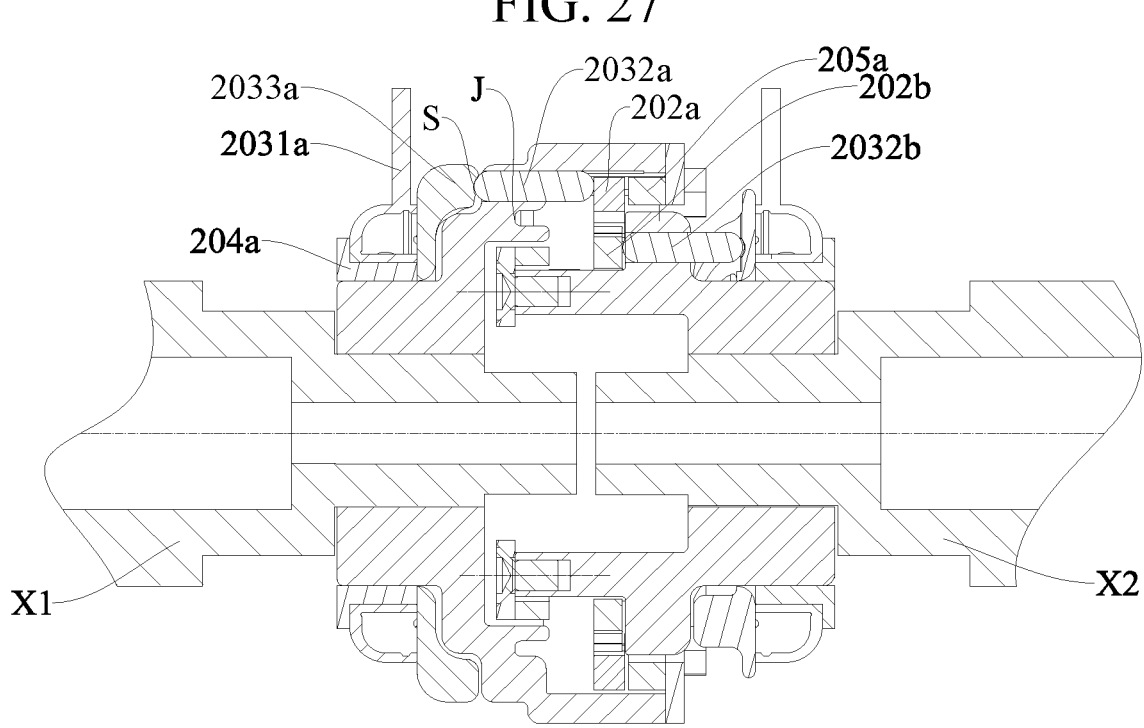
FIG. 28 is a cross-sectional view when the two-way locking device is locked in one way.
Figure 29:
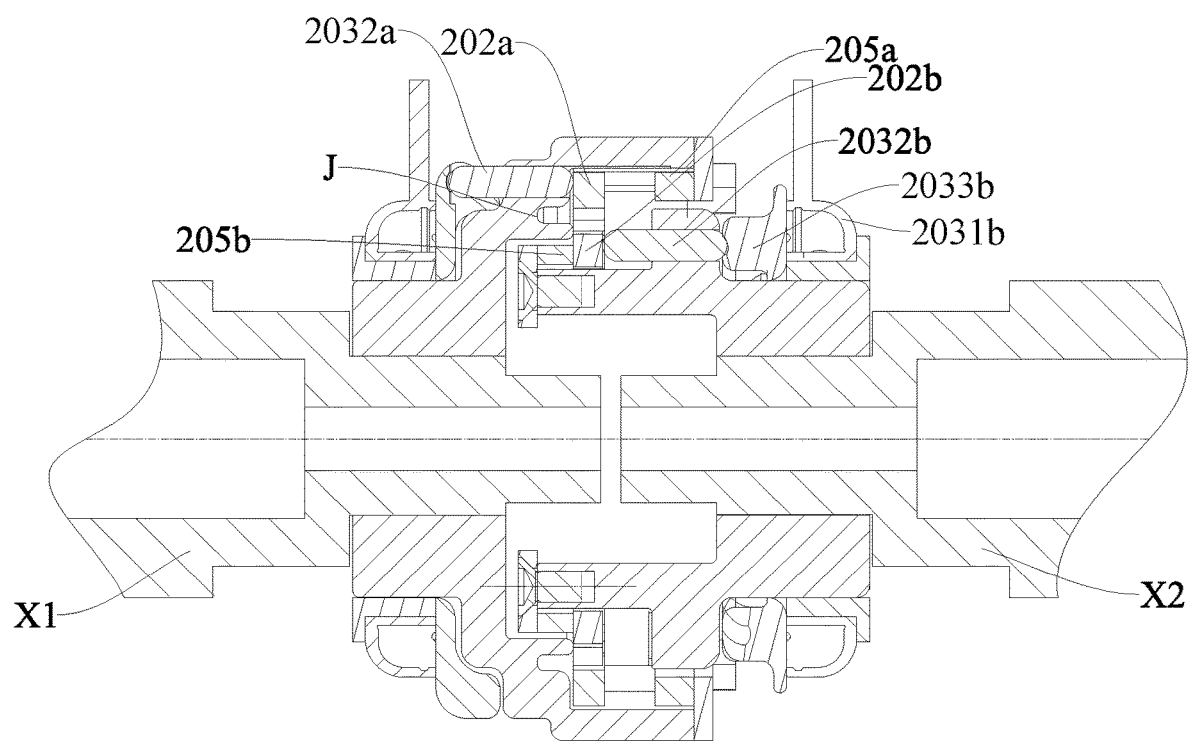
FIG. 29 is a cross-sectional view when the two-way locking device is locked in one way.

As shown in FIG. 16 and FIG. 17, the outer circumferential surface of the synchronizing ring 202 is provided with an outer ring gear portion 2021, and the inner circumferential surface of the guiding sleeve is provided with an inner tooth groove 20132a matched with teeth of the outer ring gear portion 2021. By the matching of the inner tooth groove 20132a and the outer ring gear portion 2021, the synchronizing ring 202 is normally connected to the first flange 201a. The inner circumferential surface of the synchronizing ring 202 is provided with an inner ring gear portion 2022, and the outer circumferential surface of the second flange 201b is provided with an outer tooth groove 20132b adapted to be matched with teeth of the inner ring gear portion 2022. When the synchronizing ring 202 is in the locked position, the outer tooth groove 20132b is matched with the inner ring gear portion 2022, so that the synchronizing ring 202 drives the second flange 201b to rotate synchronously.

Certainly, the implementation form of the one-way locking device 200a is not limited thereto, and another embodiment of the one-way locking device 200a is described below. The one-way locking device 200a includes a first flange 201a, a second flange 201b, a synchronizing ring 202 and a driving component 203. For the first flange 201a and the driving component 203 in this embodiment, reference may be made to the second flange 201b and the second driving component 203b in FIG. 25 to FIG. 29. The inner circumferential surface of the synchronizing ring 202 is provided with an inner ring gear portion 2022. The outer circumferential surface of the guiding sleeve is provided with an outer tooth groove 20132b matched with teeth of the inner ring gear portion 2022. The outer circumferential surface of the synchronizing ring 202 is provided with an outer ring gear portion 2021. The inner circumferential surface of the first flange 201a is provided with an inner tooth groove 20132a adapted to be matched with teeth of the outer ring gear portion 2021. That is, in the one-way locking device 200a of this embodiment, the synchronizing ring 202 internally meshes with the first flange 201a. In the embodiment of the one-way locking device 200a shown in FIG. 16 to FIG. 19, the synchronizing ring 202 externally meshes with the first flange 201a.

The working process of the one-way locking device 200a according to embodiments of the present invention will now be described with reference to FIG. 16 to FIG. 19 in conjunction with FIG. 2:

1) When the electromagnet 2031 is not energized

When the left and right wheels do not slip or the motors 101 on both sides can work normally, the electromagnet 2031 is not energized. The first flange 201a, the ejector pin 2032, the driving member 2033 and the synchronizing ring 202 rotate with the first shaft X1, the second flange 201b rotates synchronously with the second shaft X2, and the elastic return member 205 pushes the synchronizing ring 202 and the second flange 201b apart.

2) When the electromagnet 2031 is energized

When it is detected that there is a signal that the wheel on one side slips or the motor on one side fails, the electromagnet 2031 is manually or automatically controlled to be energized. The electromagnet 2031 generates electromagnetic attraction to fix the driving member 2033, and the first flange 201a and the ejector pin 2032 still rotate with the first shaft X1, causing the fixed driving member 2033 to push the ejector pin 2032 along the driving profile S toward the second flange 201b through the driving profile S, so that the synchronizing ring 202 is pushed by the axial force of the ejector pin 2032 to engage with the second flange 201b. Finally, the first shaft X1 and the second shaft X2 are locked and rotate synchronously.

3) When the synchronizing ring 202 moves from the locked position to the unlocked position, as long as the electromagnet 2031 is de-energized, the synchronizing ring 202 is pushed back to the initial position by the elastic force of the elastic return member 205.

Thereby, the one-way locking device 200a is driven by the electromagnetic force, and thus is simple in control, small in occupied space, and large in carrying capacity.

A power assembly 1000 having the above-described one-way locking device 200a will now be described. The power assembly 1000 includes the above-described locking device 200, a first power component 100a and a second power component 100b. The first power component 100a is used for driving the wheel on the left side, and the second power component 100b is used for driving the wheel on the right side. The first power component 100a and the second power component 100b each include a motor 101 and a transmission 102. The transmission 102 is adapted to be connected between the motor 101 and a wheel on the corresponding side. The first power component 100a includes a first shaft X1, and the second power component 100b includes a second shaft X2. The first flange 201a is fixed on the first shaft X1, and the second flange 201b is fixed on the second shaft X2. The locking device 200 is used for selectively synchronizing the first shaft X1 and the second shaft X2.

In some embodiments, the transmission 102 is a three-stage reducer. As shown in FIG. 2 and FIG. 3, the three-stage reducer includes an input shaft I, a first intermediate shaft II, a second intermediate shaft III and an output shaft IV. One of the input shaft I, the first intermediate shaft II, the second intermediate shaft III and the output shaft IV of the first power component 100a is the first shaft X1, and one of the input shaft I, the first intermediate shaft II, the second intermediate shaft III and the output shaft IV of the second power component 100b is the second shaft X2.

It can be understood that, in order to synchronize the first power component 100a with the second power component 100b, the first shaft X1 and the second shaft X2 are the input shafts I, the output shafts IV, the first intermediate shafts II or the second intermediate shafts III at the same time.

In some embodiments, the locking device 200 is connected between the two second intermediate shafts III to selectively synchronize the two second intermediate shafts III.

A locking device 200 according to the present invention will now be described with reference to FIG. 25 to FIG. 29 below. The locking device 200 shown in FIG. 25 to FIG. 29 is a two-way locking device 200b.

As shown in FIG. 25 to FIG. 29, the locking device 200 includes a first flange 201a, a second flange 201b, a first flange locking structure Q1 and a second flange locking structure Q2.

The first flange 201a is adapted to be fixed on the first shaft X1, and the second flange 201b is adapted to be fixed on the second shaft X2.

The first flange locking structure Q1 is used for selectively locking the first flange 201a and the second flange 201b to be adapted to rotate the second flange 201b synchronously with the first flange 201a.

The second flange locking structure Q2 is used for selectively locking the second flange 201b and the first flange 201a to be adapted to rotate the first flange 201a synchronously with the second flange 201b.

As shown in FIG. 25 to FIG. 29, the first flange locking structure Q1 includes a first synchronizing ring 202a and a first driving component 203a, and the second flange locking structure Q2 includes a second synchronizing ring 202b and a second driving component 203b.

The first synchronizing ring 202a is normally connected to the first flange 201a to be adapted to rotate synchronously with the first flange 201a, and the first synchronizing ring 202a is slidable relative to the first flange 201a. The first driving component 203a selectively pushes the first synchronizing ring 202a to slide from the first unlocked position to the first locked position in the axial direction of the first flange 201a. When the first synchronizing ring 202a is in the first locked position, the first synchronizing ring 202a is connected to the second synchronizing ring 202b to be adapted to rotate the second flange 201b synchronously with the first flange 201a, and when the first synchronizing ring 202a is in the unlocked position, the first synchronizing ring 202a is separated from the second synchronizing ring 202b.

The second synchronizing ring 202b is normally connected to the second flange 201b to be adapted to rotate synchronously with the second flange 201b, and the second synchronizing ring 202b is slidable relative to the second flange 201b. The second driving component 203b selectively pushes the second synchronizing ring 202b to slide from the second unlocked position to the second locked position in the axial direction of the second flange 201b. When the second synchronizing ring 202b is in the second locked position, the second synchronizing ring 202b is connected to the first synchronizing ring 202a to be adapted to rotate the first flange 201a synchronously with the second flange 201b, and when the second synchronizing ring 202b is in the unlocked position, the first synchronizing ring 202a is separated from the second synchronizing ring 202b.

That is, the first synchronizing ring 202a moves in the axial direction of the first flange 201a relative to the first flange 201a under the pushing of the first driving component 203a. When the first synchronizing ring 202a is in the first locked position, the first synchronizing ring 202a is connected to the first flange 201a, and the first synchronizing ring 202a is also connected to the second synchronizing ring 202b, so that the first flange 201a drives the second flange 201b to rotate synchronously by the matching of the first synchronizing ring 202a and the second synchronizing ring 202b to realize power transmission. When the first synchronizing ring 202a is in the unlocked position, the first synchronizing ring 202a is connected to the first flange 201a, and the first synchronizing ring 202a is separated from the second synchronizing ring 202b such that the first flange 201a and the second flange 201b both rotate independently.

The second synchronizing ring 202b moves in the axial direction of the second flange 201b relative to the second flange 201b under the pushing of the second driving component 203b. When the second synchronizing ring 202b is in the second locked position, the second synchronizing ring 202b is connected to the second flange 201b, and the second synchronizing ring 202b is also connected to the first synchronizing ring 202a, so that the second flange 201b drives the first flange 201a to rotate synchronously by the matching of the first synchronizing ring 202a and the second synchronizing ring 202b to realize power transmission. When the second synchronizing ring 202b is in the unlocked position, the second synchronizing ring 202b is connected to the second flange 201b, and the second synchronizing ring 202b is separated from the first synchronizing ring 202a, so that the first flange 201a and the second flange 201b both rotate independently.

The locking device 200 according to embodiments of the present invention can realize two-way locking, thereby realizing the transmission of power from the first flange 201a to the second flange 201b or the transmission of power from the second flange 201b to the first flange 201a, and thus, is simple in control, less in occupied space, easy for arrangement and large in carrying capacity. After locking, the locking device can exert the maximum power transmission advantage of the transmission system, and enhance the power performance of the vehicle, which is beneficial to escape when the wheel slips.

As shown in FIG. 25 to FIG. 29, the first driving component 203a includes a first electromagnet 2031a, a first ejector pin 2032a and a first driving member 2033a. The first electromagnet 2031a is adapted to be fixed to the housing 103, and one end of the first ejector pin 2032a is slidably connected to the first flange 201a. The first driving member 2033a is provided with a first driving profile S1, and the other end of the first ejector pin 2032a is matched with the first driving profile S1. The first electromagnet 2031a is selectively energized. When the first electromagnet 2031a is energized, the first driving member 2033a is fixed, and the first flange 201a rotates, so that the first driving member 2033a drives the first ejector pin 2032a to move in the axial direction of the first flange 201a through the first driving profile S1, and the first ejector pin 2032a pushes the first synchronizing ring 202a to move from a position where the first synchronizing ring 202a is separated from the second synchronizing ring 202b to a position where the first synchronizing ring 202a is connected to the second synchronizing ring 202b.

As shown in FIG. 25 to FIG. 29, the second driving component 203b includes a second electromagnet 2031b, a second ejector pin 2032b and a second driving member 2033b. The second electromagnet 2031b is adapted to be fixed to the housing 103, and one end of the second ejector pin 2032b is slidably connected to the second flange 201b. The second driving member 2033b is provided with a second driving profile S1, and the other end of the second ejector pin 2032b is matched with the second driving profile S1. The second electromagnet 2031b is selectively energized. When the second electromagnet 2031b is energized, the second driving member 2033b is fixed, and the second flange 201b rotates, so that the second driving member 2033b drives the second ejector pin 2032b to move in the axial direction of the second flange 201b through the second driving profile S1, and the second ejector pin 2032b pushes the second synchronizing ring 202b to move from a position where the first synchronizing ring 202a is separated from the second synchronizing ring 202b to a position where the first synchronizing ring 202a is connected to the second synchronizing ring 202b.

As shown in FIG. 25 to FIG. 29, the first ejector pin 2032a and the first driving profile S1 are both multiple and in one-to-one correspondence, and the first ejector pins 2032a are spaced apart in a circumferential direction of the first flange 201a. The second ejector pin 2032b and the second driving profile S1 are both multiple and in one-to-one correspondence, and the second ejector pins 2032b are spaced apart in a circumferential direction of the second flange 201b.

The first driving profile S1 is a V-shaped profile, and in the axial direction of the first flange 201a, the opening of the V-shaped profile of the first driving member 2033a increases from one end away from the second flange 201b to one end near the second flange 201b. In the axial direction of the first flange 201a, a side wall of the V-shaped profile of the first driving member 2033a extends along a straight line or an arc from one end away from the second flange 201b to one end near the second flange 201b.

The second driving profile S1 is a V-shaped profile, and in the axial direction of the second flange 201b, the opening of the V-shaped profile of the second driving member 2033b increases from one end away from the first flange 201a to one end near the first flange 201a. In the axial direction of the second flange 201b, a side wall of the V-shaped profile of the second driving member 2033b extends along a straight line or an arc from one end away from the first flange 201a to one end near the first flange 201a.

Further, the first flange locking structure Q1 further includes a first bushing 204a, the first bushing 204a is sleeved over and fixed on the first flange 201a, and in the axial direction of the first flange 201a, the first electromagnet 2031a is sandwiched between the first bushing 204a and the corresponding housing 103.

The second flange locking structure Q2 further includes a second bushing 204b, the second bushing 204b is sleeved over and fixed on the second flange 201b, and in the axial direction of the second flange 201b, the second electromagnet 2031b is sandwiched between the second bushing 204b and the corresponding housing 103.

The first flange locking structure Q1 further includes a first stop piece 206a and a first elastic return member 205a. The first elastic return member 205a is connected to the first stop piece 206a, and the first stop piece 206a is connected to the first flange 201a. In the axial direction of the first flange 201a, the first elastic return member 205a is located between the first synchronizing ring 202a and the first stop piece 206a. During the movement of the first synchronizing ring 202a from the first unlocked position to the first locked position, the first elastic return member is compressed.

Optionally, the first stop piece 206a is connected to the first flange 201a by a first threaded connecting piece 207a.

The second flange locking structure Q2 further includes a second stop piece 206b and a second elastic return member 205b. The second elastic return member 205b is connected to the second stop piece 206b, and the second stop piece 206b is connected to the second flange 201b. In the axial direction of the second flange 201b, the second elastic return member 205b is located between the second synchronizing ring 202b and the second stop piece 206b. During the movement of the second synchronizing ring 202b from the second unlocked position to the second locked position, the second elastic return member is compressed.

In some embodiments, the second stop piece 206b is connected to the second flange 201b by a second threaded connecting piece 207b.

In some embodiments, the first elastic return member 205a and the second elastic return member 205b may both be wave springs.

In some embodiments of the present invention, as shown in FIG. 25 to FIG. 29, the first flange 201a includes a first fixing sleeve 2011a, a first mounting sleeve 2012a and a first guiding sleeve 2013a. The first fixing sleeve 2011a is sleeved over and fixed on the first shaft X1, and both the first electromagnet 2031a and the first driving member 2033a are sleeved over the first fixing sleeve 2011a. The first mounting sleeve 2012a is provided with a first through hole D1 extending through the first mounting sleeve 2012a in the axial direction of the first flange 201a, and the first ejector pin 2032a is slidably disposed in the first through hole D1. The first guiding sleeve 2013a is provided with a first guiding groove 20131a, and the first ejector pin 2032a is slidably disposed in the first guiding groove 20131a.

In the axial direction of the first flange 201a, the first fixing sleeve 2011a, the first mounting sleeve 2012a and the first guiding sleeve 2013a are sequentially connected and the distance to the second flange 201b is decreased.

In some embodiments of the present invention, as shown in FIG. 25 to FIG. 29, the second flange 201b includes a second fixing sleeve 2011b, a second mounting sleeve 2012b and a second guiding sleeve 2013b. The second fixing sleeve 2011b is sleeved over and fixed on the second shaft X2, and both the second electromagnet 2031b and the second driving member 2033b are sleeved over the second fixing sleeve 2011b. The second mounting sleeve 2012b is provided with a second through hole D2 extending through the second mounting sleeve 2012b in the axial direction of the second flange 201b, and the second ejector pin 2032b is slidably disposed in the second through hole D2. The second guiding sleeve 2013b is provided with a second guiding groove, and the second ejector pin 2032b is slidably disposed in the second guiding groove.

In the axial direction of the second flange 201b, the second fixing sleeve 2011b, the second mounting sleeve 2012b and the second guiding sleeve 2013b are sequentially connected and the distance to the first flange 201a is decreased.

In one embodiment as shown in FIG. 25 to FIG. 29, the first guiding groove 20131a of the first flange 201a is disposed on the inner circumferential surface of the first guiding sleeve 2013a, and the second guiding groove of the second flange 201b is disposed on the outer circumferential surface of the second guiding sleeve 2013b.

Further, the outer circumferential surface of the first synchronizing ring 202a is provided with a first outer ring gear portion 2021a, and the inner circumferential surface of the first guiding sleeve 2013a is provided with an inner tooth groove 20132a matched with teeth of the first outer ring gear portion 2021a. The inner circumferential surface of the second synchronizing ring 202b is provided with a second inner ring gear portion 2022b, and the outer circumferential surface of the second guiding sleeve 2013b is provided with an outer tooth groove 20132b matched with teeth of the second inner ring gear portion 2022b. The inner circumferential surface of the first synchronizing ring 202a is provided with a first inner ring gear portion 2022a, and the outer circumferential surface of the second synchronizing ring 202b is provided with a tooth groove adapted to be matched with teeth of the first inner ring gear portion 2022a. A first intermediate connecting portion 2023a is connected between the first outer ring gear portion 2021a and the first inner ring gear portion 2022a. A second intermediate connecting portion 2023b is connected between the second outer ring gear portion 2021*b* and the second inner ring gear portion 2022*b*, and the second outer ring gear portion 2021*b* is adapted to be matched with the first inner ring gear portion 2022*a*.

As shown in FIG. 25 to FIG. 29, in the radial direction, the first guiding sleeve 2013*a*, the first synchronizing ring 202*a*, the second synchronizing ring 202*b* and the second guiding sleeve 2013*b* are disposed sequentially from the outside to the inside.

As can be seen from the above description, as shown in FIG. 25 to FIG. 29, the locking device 200 includes a first flange 201*a*, a second flange 201*b*, a first flange locking structure Q1 and a second flange locking structure Q2. The first flange locking structure Q1 is used for selectively locking the first flange 201*a* and the second flange 201*b* to be adapted to rotate the second flange 201*b* synchronously with the first flange 201*a*. The second flange locking structure Q2 is used for selectively locking the second flange 201*b* and the first flange 201*a* to be adapted to rotate the first flange 201*a* synchronously with the second flange 201*b*.

The first flange locking structure Q1 and the second flange locking structure Q2 each include a synchronizing ring 202 and a driving component 203. The synchronizing ring 202 is normally connected to the corresponding flange to be adapted to rotate synchronously with the corresponding flange, and the synchronizing ring 202 is slidable relative to the corresponding flange. The driving component 203 selectively pushes the synchronizing ring 202 to slide from the unlocked position to the locked position in the axial direction of the corresponding flange. When the synchronizing ring 202 is in the locked position, the two synchronizing rings 202 are connected to be adapted to rotate the other flange synchronously with the flange corresponding to the synchronizing ring 202. When the synchronizing ring 202 is in the unlocked position, the two synchronizing rings 202 are separated.

Each of the driving components 203 includes an electromagnet 2031, an ejector pin 2032 and a driving member 2033. The electromagnet 2031 is adapted to be fixed on the housing 103. One end of the ejector pin 2032 is slidably connected to the corresponding flange, and the driving member 2033 is provided with a driving profile S. The other end of the ejector pin 2032 is matched with the driving profile S, and the electromagnet 2031 is selectively energized. When the electromagnet 2031 is energized, the driving member 2033 is fixed to drive the ejector pin 2032 to move in the axial direction of the corresponding flange through the driving profile S and push the corresponding synchronizing ring 202 to move from a position where the two synchronizing rings 202 are separated to a position where the two synchronizing rings 202 are connected.

In some embodiments, the ejector pin 2032 and the driving profile S are multiple and in one-to-one correspondence, and the ejector pins 2032 are spaced apart in the circumferential direction of the corresponding flange.

In some embodiments, the driving profile S is a V-shaped profile, and in the axial direction of the corresponding flange, the opening of the V-shaped profile increases from one end away from the other flange to one end near the other flange.

In some embodiments, in the axial direction of the corresponding flange, a side wall of the V-shaped profile extends along a straight line or an arc from one end away from the other flange to one end near the other flange.

In some embodiments, the first flange locking structure Q1 and the second flange locking structure Q2 each further include a bushing 204. The bushing 204 is sleeved over and fixed on the corresponding flange, and in the axial direction of the corresponding flange, the electromagnet 2031 is sandwiched between the bushing 204 and the corresponding housing 103.

In some embodiments, the first flange locking structure Q1 and the second flange locking structure Q2 each further include: a stop piece and an elastic return member 205. The elastic return member 205 is connected to the stop piece, and the stop piece is connected to the corresponding flange. In the axial direction of the corresponding flange, the elastic return member 205 is located between the corresponding synchronizing ring 202 and the stop piece. During the movement of the corresponding synchronizing ring 202 from the unlocked position to the locked position, the elastic return member is compressed.

In some embodiments, the elastic return member 205 is a wave spring.

In some embodiments, the first flange 201*a* and the second flange 201*b* may each include a fixing sleeve, a mounting sleeve and a guiding sleeve. The fixing sleeve is sleeved over and fixed on the corresponding shaft, and both the electromagnet 2031 and the driving member 2033 are sleeved over the fixing sleeve. The mounting sleeve is provided with a through hole D extending through the mounting sleeve in the axial direction of the corresponding flange, and the ejector pin 2032 is slidably disposed in the through hole D. The guiding sleeve is provided with a guiding groove, and the ejector pin 2032 is slidably disposed in the guiding groove.

In the axial direction of the corresponding flange, the fixing sleeve, the mounting sleeve and the guiding sleeve are sequentially connected and the distance to the other flange is decreased. The guiding groove of the first flange 201*a* is disposed on an inner circumferential surface of the guiding sleeve, and the guiding groove of the second flange 201*b* is disposed on an outer circumferential surface of the guiding sleeve.

An outer circumferential surface of the synchronizing ring 202 of the first flange locking structure Q1 is provided with an outer ring gear portion 2021, and the inner circumferential surface of the guiding sleeve of the first flange locking structure Q1 is provided with an inner tooth groove 20132*a* matched with teeth of the outer ring gear portion 2021. An inner circumferential surface of the synchronizing ring 202 of the second flange locking structure Q2 is provided with an inner ring gear portion 2022, and the outer circumferential surface of the guiding sleeve of the second flange locking structure Q2 is provided with an outer tooth groove 20132*b* matched with teeth of the inner ring gear portion 2022.

The working process of the two-way locking device 200*a* according to embodiments of the present invention will now be described with reference to FIG. 25 to FIG. 29 in conjunction with FIG. 2:

1) When both the first electromagnet 2031*a* and the second electromagnet 2031*b* are not energized When the left and right wheels do not slip or both motors 101 can work normally, neither the first electromagnet 2031*a* nor the second electromagnet 2031*b* is energized. The first flange 201*a*, the first ejector pin 2032*a*, the first driving member 2033*a* and the first synchronizing ring 202*a* rotate with the first shaft X1, and the second flange 201*b*, the second ejector pin 2032*b*, the second driving member 2033*b* and the second synchronizing ring 202*b* rotate synchronously with the second shaft X2. The first elastic return member 205*a* pushes the first synchronizing ring 202*a* and the second synchronizing ring 202*b* apart, and the second elastic return member 205b pushes the first synchronizing ring 202a and the second synchronizing ring 202b apart.

2) When the first electromagnet 2031a is energized

When it is detected that there is a signal indicating that the wheel on the right side slips or the motor on the right side fails, the first electromagnet 2031a is manually or automatically controlled to be energized. The first electromagnet 2031a generates electromagnetic attraction to fix the first driving member 2033a, and the first flange 201a and the first ejector pin 2032a still rotate with the first shaft X1, causing the fixed first driving member 2033a to push the first ejector pin 2032a along the first driving profile S1 toward the second synchronizing ring 202b through the first driving profile S1, so that the first synchronizing ring 202a is pushed by the axial force of the first ejector pin 2032a to engage with the second synchronizing ring 202b. Finally, the first shaft X1 and the second shaft X2 are locked and rotate synchronously.

4) When the first synchronizing ring 202a moves from the first locked position to the first unlocked position, as long as the first electromagnet 2031a is de-energized, the first synchronizing ring 202a is pushed back to the initial position by the elastic force of the first elastic return member 205a.

5) When it is detected that there is a signal indicating that the wheel on the left side slips or the motor on the left side fails, the second electromagnet 2031b is manually or automatically controlled to be energized. The second electromagnet 2031b generates electromagnetic attraction to fix the second driving member 2033b, and the second flange 201b and the second ejector pin 2032b still rotate with the second axis X2, causing the fixed second driving member 2033b to push the second ejector pin 2032b toward the first synchronizing ring 202a along the second driving profile Si through the second driving profile S1, so that the second synchronizing ring 202b is pushed by the axial force of the second ejector pin 2032b to engage with the first synchronizing ring 202a. Finally, the first shaft X1 and the second shaft X2 are locked and rotate synchronously.

6) When the second synchronizing ring 202b moves from the second locked position to the second unlocked position, as long as the second electromagnet 2031b is de-energized, the second synchronizing ring 202b is pushed back to the initial position by the elastic force of the second elastic return member 205b.

Thereby, the two-way locking device 200b is driven by the electromagnetic force, and thus is simple in control, small in occupied space, and large in carrying capacity.

A power assembly 1000 having the above-described two-way locking device 200b will now be described. The power assembly 1000 includes the above-described locking device 200, a first power component 100a and a second power component 100b. The first power component 100a is used for driving the wheel on the left side, and the second power component 100b is used for driving the wheel on the right side. The first power component 100a and the second power component 100b each include a motor 101 and a transmission 102. The transmission 102 is adapted to be connected between the motor 101 and a wheel on the corresponding side. The first power component 100a includes a first shaft X1, and the second power component 100b includes a second shaft X2. The first flange 201a is fixed on the first shaft X1, and the second flange 201b is fixed on the second shaft X2. The locking device 200 is used for selectively synchronizing the first shaft X1 and the second shaft X2.

In some embodiments, the transmission 102 is a three-stage reducer. As shown in FIG. 2 and FIG. 3, the three-stage reducer includes an input shaft I, a first intermediate shaft II, a second intermediate shaft III and an output shaft IV. One of the input shaft I, the first intermediate shaft II, the second intermediate shaft III and the output shaft IV of the first power component 100a is the first shaft X1, and one of the input shaft I, the first intermediate shaft II, the second intermediate shaft III and the output shaft IV of the second power component 100b is the second shaft X2.

It can be understood that, in order to synchronize the first power component 100a with the second power component 100b, the first shaft X1 and the second shaft X2 are the input shafts I, the output shafts IV, the first intermediate shafts II or the second intermediate shafts III at the same time.

In some embodiments, the locking device 200 is connected between the two second intermediate shafts III to selectively synchronize the two second intermediate shafts III.

A flange assembly 300 according to the present invention will now be described in detail with reference to FIG. 20 to FIG. 24 in conjunction with FIG. 16 to FIG. 19 and FIG. 25 to FIG. 29.

The flange assembly 300 according to embodiments of the present invention includes a flange, a synchronizing ring 202 and a driving component 203. The synchronizing ring 202 is normally connected to the flange to be adapted to rotate synchronously with the flange, and the synchronizing ring 202 is slidable relative to the flange. The driving component 203 selectively drives the synchronizing ring 202 to disengage from the unlocked position in the axial direction of the flange.

When the synchronizing ring 202 is in the unlocked position, the synchronizing ring 202 is fit with a fitting end surface M of the flange, and the fitting end surface M is provided with a concave portion J recessed away from the synchronizing ring 202. Therefore, the contact area between the fitting end surface M of the flange and the synchronizing ring 202 is small, and thus, when the synchronizing ring 202 disengages from the unlocked position, the resistance is small and the disengagement is easier.

In some embodiments, the flange assembly 300 is disposed in a case body, and the flange assembly 300 is immersed in lubricating oil. Therefore, when the synchronizing ring 202 is in the unlocked position, the synchronizing ring 202 is fit with the fitting end surface M of the flange, and is not easily separated. According to the present invention, by disposing the concave portion J on the fitting end surface M, the contact area is reduced, so that the synchronizing ring 202 and the flange are more easily separated.

In some embodiments, the concave portion J includes an annular groove disposed on the fitting end surface M, and the annular groove extends by one full turn in the circumferential direction of the flange.

In some embodiments, the concave portion J may include multiple pits disposed on the fitting end surface M, and the multiple pits are spaced apart in the circumferential direction of the flange.

In some embodiments, the concave portion J may include multiple via holes disposed on the fitting end surface M and extending through the first flange 201a in the axial direction of the flange, and the multiple via holes are spaced apart in the circumferential direction of the flange. The arrangement of the via holes not only makes the synchronizing ring 202 easier to disengage from the flange, but also reduces the weight of the flange.

It can be understood that the flange here may be the first flange 201a or the second flange 201b.

Further, in the embodiment in which the flange is sleeved over the synchronizing ring 202, the synchronizing ring 202 includes an outer ring gear portion 2021, an intermediate connecting portion 2023 and an inner ring gear portion 2022 which are sequentially connected from the outside to the inside in the radial direction of the synchronizing ring 202. The flange is provided with an internal tooth groove 20132a matched with teeth of the outer ring gear portion 2021. In the axial direction of the flange, the concave portion J is disposed opposite to at least a portion of the inner ring gear portion 2022, and the ejector pin 2032 is disposed opposite to the intermediate connecting portion 2023, whereby the thrust of the ejector pin 2032 is more easily transmitted to the synchronizing ring 202.

Further, in the embodiment in which the synchronizing ring 202 is sleeved over the flange, the synchronizing ring 202 includes an outer ring gear portion 2021, an intermediate connecting portion 2023 and an inner ring gear portion 2022 which are sequentially connected from the outside to the inside in the radial direction of the synchronizing ring 202. The flange is provided with an outer tooth groove 20132b matched with teeth of the inner ring gear portion 2022, and the concave portion J is disposed opposite to at least a portion of the outer ring gear portion 2021 in the axial direction of the flange.

Yet another locking device 200 according to embodiments of the present invention will be briefly described below. The locking device 200 is a one-way locking device 200a, including the flange assembly 300 and the second flange 201b in the above embodiment, the flange is a first flange 201a, the first flange 201a is adapted to be fixed on the first shaft X1, and the second flange 201b is adapted to be fixed on the second shaft X2. The driving component 203 selectively pushes the synchronizing ring 202 to slide from an unlocked position to a locked position in an axial direction of the first flange 201a. When the synchronizing ring 202 is in the locked position, the synchronizing ring 202 is connected to the second flange 201b to be adapted to rotate the second flange 201b synchronously with the first flange 201a. When the synchronizing ring 202 is in the unlocked position, the synchronizing ring 202 is separated from the second flange 201b.

The difference between this embodiment and the embodiment shown in FIG. 16 to FIG. 19 is that the structure of the flange provided with the ejector pin 2032 is different, that is, in the embodiment, the fitting end surface M of the flange (first flange 201a) provided with the ejector pin 2032 and the synchronizing ring 202 is provided with a concave portion J recessed in a direction away from the synchronizing ring 202, whereby the disengagement of the synchronizing ring 202 from the flange is easier. Specifically, when the electromagnet 2031 is de-energized, the synchronizing ring 202 is more easily separated from the first flange 201a.

That is, the flange assembly 300 described above can be used in the one-way locking device 200a.

A locking device 200 according to embodiments of the present invention will be briefly described below. The locking device 200 includes two flange assemblies 300. One of the flange assemblies 300 includes a first flange 201a, a first synchronizing ring 202a and a first driving component 203a. The other flange assembly 300 includes a second flange 201b, a second synchronizing ring 202b and a second driving component 203b.

The first flange 201a is adapted to be fixed on the first shaft X1, and the second flange 201b is adapted to be fixed on the second shaft X2. The first synchronizing ring 202a is normally connected to the first flange 201a to be adapted to rotate synchronously with the first flange 201a, and the first synchronizing ring 202a is slidable relative to the first flange 201a. The first driving component 203a selectively pushes the first synchronizing ring 202a to slide from the first unlocked position to the first locked position in the axial direction of the first flange 201a. When the first synchronizing ring 202a is in the first locked position, the first synchronizing ring 202a is connected to the second synchronizing ring 202b to be adapted to rotate the second flange 201b synchronously with the first flange 201a, and when the first synchronizing ring 202a is in the unlocked position, the first synchronizing ring 202a is separated from the second synchronizing ring 202b.

The second synchronizing ring 202b is normally connected to the second flange 201b to be adapted to rotate synchronously with the second flange 201b, and the second synchronizing ring 202b is slidable relative to the second flange 201b. The second driving component 203b selectively pushes the second synchronizing ring 202b to slide from the second unlocked position to the second locked position in the axial direction of the second flange 201b. When the second synchronizing ring 202b is in the second locked position, the second synchronizing ring 202b is connected to the first synchronizing ring 202a to be adapted to rotate the first flange 201a synchronously with the second flange 201b, and when the second synchronizing ring 202b is in the unlocked position, the first synchronizing ring 202a is separated from the second synchronizing ring 202b.

That is, the flange assembly 300 may be applied to the two-way locking device 200b such that the first flange 201a and the second flange 201b may each be provided with a concave portion J, so that the first synchronizing ring 202a is more easily separated from the first flange 201a and the second flange 201b is more easily separated from the second synchronizing ring 202b. Specifically, when the first electromagnet 2031a is de-energized, the first synchronizing ring 202a is more easily separated from the first flange 201a. Alternatively, when the second electromagnet 2031b is de-energized, the second synchronizing ring 202b is more easily separated from the second flange 201b.

A power transmission system 10000 according to embodiments of the present invention is described below. The power transmission system 10000 includes at least one power assembly 1000 and a locking device 200.

The power assembly 1000 includes a first power component 100a and a second power component 100b. The first power component 100a is used for driving a wheel on the left side, and the second power component 100b is used for driving a wheel on the right side. The first power component 100a and the second power component 100b each include a motor 101 and a transmission 102, and the transmission 102 is adapted to be connected between the motor 101 and a wheel on the corresponding side.

The first power component 100a and the second power component 100b are connected by the locking device 200 for selective synchronization. When one of the wheel on the right side and the wheel on the left side slips or one of the two motors 101 is damaged or fails, the locking device 200 synchronizes the first power component 100a and the second power component 100b.

That is, the locking device 200 is used for locking the first power component 100a and the second power component 100b when the wheel on one side slips or one of the two motors 101 is damaged or fails such that the first power component 100a and the second power component 100b are synchronized, so that the wheels on both sides rotate synchronously, and the vehicle has a strong ability to escape. When one motor 101 fails, the driving of the vehicle can still be realized.

In the power transmission system 10000 of this embodiment, the first power component 100a, the second power component 100b and the housing 103 may each employ the first power component 100a, the second power component 100b and the housing 103 described in the above embodiments. Certainly, the housing 103 corresponds to the housing 103 provided with the locking device 200.

The locking device 200 may be the one-way locking device 200a shown in FIG. 16 to FIG. 19, the locking device 200 may also be the two-way locking device 200b shown in FIG. 25 to FIG. 29, and the locking device 200 may also be the locking device 200 having the recessed portion J shown in FIG. 20 to FIG. 24.

In some embodiments, the first power component 100a and the second power component 100b each include a housing 103, and a motor 101 and a transmission 102 that are disposed in the housing 103. The two housings 103 are connected and the connecting portion of the two housings 103 defines an accommodating cavity 1041, and the locking device 200 is disposed in the accommodating cavity 1041. The two transmissions 102 are connected by the locking device 200 for selective synchronization. The transmission 102 is a three-stage reducer. The two second intermediate shafts III are connected by the locking device 200. When one of the two motors 101 is damaged or fails or the wheel on one side slips, the two second intermediate shafts III rotate synchronously.

The locking device 200 includes two flanges, and the two flanges are fixed in one-to-one correspondence with the two shafts for selectively locking the two flanges to be adapted to at least one flange locking structure for rotating the two flanges synchronously.

The flange locking structure includes a synchronizing ring 202 and a driving component 203. The synchronizing ring 202 is normally connected to the corresponding flange to be adapted to rotate synchronously with the corresponding flange, and the synchronizing ring 202 is slidable relative to the corresponding flange. The driving component 203 selectively pushes the synchronizing ring 202 to slide from an unlocked position to a locked position in an axial direction of the corresponding flange. When the synchronizing ring 202 is in the locked position, the two flanges rotate synchronously, and when the synchronizing ring 202 is in the unlocked position, the two flanges are independent of each other.

Further, the synchronizing ring 202 is fit with the fitting end surface M of the corresponding flange, and the fitting end surface M is provided with a concave portion J recessed away from the synchronizing ring 202.

The flange includes a fixing sleeve, a mounting sleeve and a guiding sleeve. The fixing sleeve is adapted to be sleeved over and fixed on a shaft, and both the electromagnet 2031 and the driving member 2033 are sleeved over the fixing sleeve. The mounting sleeve is provided with a through hole D extending through the mounting sleeve in the axial direction of the flange, and the ejector pin 2032 is slidably disposed in the through hole D. The guiding sleeve is provided with a guiding groove, and the ejector pin 2032 is slidably disposed in the guiding groove. A concave portion J is disposed on an end surface of the mounting sleeve.

In some embodiments, the quantity of the flange locking structures is one, and the flange locking structure is used for selectively locking the two flanges to be adapted to rotate one of the two flanges synchronously with the other of the two flanges. Thus, the locking device 200 is a one-way locking device 200a.

In some embodiments, the quantity of the flange locking structures is two, and the flange locking structures are used for selectively locking the two flanges. One of the flange locking structures is used for selectively locking the two flanges to be adapted to rotate one of the two flanges synchronously with the other of the two flanges. The other of the flange locking structures is used for selectively locking the two flanges to be adapted to rotate the other of the two flanges synchronously with one of the two flanges. Thus, the locking device 200 is a two-way locking device 200a.

A power transmission system 10000 according to embodiments of the present invention will now be described with reference to FIG. 1. As shown in FIG. 1, the power transmission system 10000 includes a first power assembly 1000, a second power assembly 1000, a first locking device C1 and a second locking device C2.

The first power assembly 1000 is used for driving a front wheel of the vehicle, the second power assembly 1000 is used for driving a rear wheel of the vehicle, and the first power assembly 1000 and the second power assembly 1000 each include a first power component 100a and a second power component 100b. The first power component 100a is used for driving a wheel on the left side, and the second power component 100b is used for driving a wheel on the right side. The first power component 100a and the second power component 100b each include a motor 101 and a transmission 102, and the transmission 102 is adapted to be connected between the motor 101 and the wheel on the corresponding side.

The first power component 100a and the second power component 100b of the first power assembly 1000 are connected by a first locking structure for selective synchronization.

The first power component 100a and the second power component 100b of the second power assembly 1000 are connected by a second locking structure for selective synchronization.

The first locking device C1 and the second locking device C2 are both a two-way locking device 200b. The two-way locking device 200b is used for selectively synchronizing the first power component 100a and the second power component 100b such that the first power component 100a moves synchronously with the second power component 100b or the second power component 100b moves synchronously with the first power component 100a.

The two-way locking device 200b includes a first flange 201a, a second flange 201b, a first flange locking structure Q1 and a second flange locking structure Q2.

The first flange 201a is fixed on the first shaft X1, and the first shaft X1 is the transmission shaft of the transmission 102 of the first power component 100a. The second flange 201b is fixed on the second shaft X2, and the second shaft X2 is the transmission shaft of the transmission 102 of the second power component 100b.

The first flange locking structure Q1 is used for selectively locking the first flange 201a and the second flange 201b to be adapted to rotate the second flange 201b synchronously with the first flange 201a.

The second flange locking structure Q2 is used for selectively locking the second flange 201b and the first flange 201a to be adapted to rotate the first flange 201a synchronously with the second flange 201b.

The first flange locking structure Q1 and the second flange locking structure Q2 each include a synchronizing ring 202 and a driving component 203.

The synchronizing ring 202 is normally connected to the corresponding flange to be adapted to rotate synchronously with the corresponding flange, and the synchronizing ring 202 is slidable relative to the corresponding flange. The driving component 203 selectively pushes the synchronizing ring 202 to slide from the unlocked position to the locked position in the axial direction of the corresponding flange.

When the synchronizing ring 202 is in the locked position, the two synchronizing rings 202 are connected to be adapted to rotate the other flange synchronously with the flange corresponding to the synchronizing ring 202. When the synchronizing ring 202 is in the unlocked position, the two synchronizing rings 202 are separated.

The driving component 203 includes an electromagnet 2031, an ejector pin 2032 and a driving member 2033. The electromagnet 2031 is adapted to be fixed on the housing 103. One end of the ejector pin 2032 is slidably connected to the corresponding flange. The driving member 2033 is provided with a driving profile S. The other end of the ejector pin 2032 is matched with the driving profile S.

The electromagnet 2031 is selectively energized. When the wheel on the corresponding side slips, the electromagnet 2031 is energized, the driving member 2033 is fixed to drive the ejector pin 2032 to move in the axial direction of the corresponding flange by the driving profile S, and to push the corresponding synchronizing ring 202 to move from a position where the two synchronizing rings 202 are separated to a position where the two synchronizing rings 202 are connected.

The first flange locking structure Q1 and the second flange locking structure Q2 each further include a stop piece and an elastic return member 205. The elastic return member 205 is connected to the stop piece, and the stop piece is connected to the corresponding flange. In the axial direction of the corresponding flange, the elastic return member 205 is located between the corresponding synchronizing ring 202 and the stop piece. During the movement of the corresponding synchronizing ring 202 from the unlocked position to the locked position, the elastic return member is compressed.

The elastic return member 205 is a wave spring.

The power transmission system 10000 has a single motor front-wheel drive mode. When the power transmission system 10000 is in the single motor front-wheel drive mode, only one motor 101 of the first power assembly 1000 works, and the first locking device C1 synchronizes the corresponding first power component 100a and the second power component 100b.

The power transmission system 10000 has a single motor rear-wheel drive mode. When the power transmission system 10000 is in the single motor rear-wheel drive mode, only one motor 101 of the second power assembly 1000 works, and the second locking device C2 synchronizes the corresponding first power component 100a and the second power component 100b.

The power transmission system 10000 has a first dual motor front-wheel drive mode. When the power transmission system 10000 is in the first dual motor front-wheel drive mode, only the two motors 101 of the first power assembly 1000 work.

The power transmission system 10000 has a second dual motor front-wheel drive mode. When the power transmission system 10000 is in the second dual motor front-wheel drive mode, only the two motors 101 of the first power assembly 1000 work, and when the front wheel on one side slips, the first locking device C1 synchronizes the corresponding first power component 100a and second power component 100b.

The power transmission system 10000 has a first dual motor rear-wheel drive mode. When the power transmission system 10000 is in the first dual motor rear-wheel drive mode, only the two motors 101 of the second power assembly 1000 work.

The power transmission system 10000 has a second dual motor rear-wheel drive mode. When the power transmission system 10000 is in the second dual motor rear-wheel drive mode, only the two motors 101 of the second power assembly 1000 work, and when the rear wheel on one side slips, the second locking device C2 synchronizes the corresponding first power component 100a and second power component 100b.

The power transmission system 10000 has a dual motor four-wheel drive mode. When the power transmission system 10000 is in the dual motor four-wheel drive mode, only one of the two motors 101 of the first power assembly 1000 works, and only one of the two motors 101 of the second power assembly 1000 works. The first locking device C1 synchronizes the corresponding first power component 100a and the second power component 100b, and the second locking device C2 synchronizes the corresponding first power component 100a and second power component 100b.

The power transmission system 10000 has a first three-motor four-wheel drive mode. When the power transmission system 10000 is in the first three-motor four-wheel drive mode, only one of the two motors 101 of the first power assembly 1000 works, and both the two motors 101 of the second power assembly 1000 work. The first locking device C1 synchronizes the corresponding first power component 100a and second power component 100b.

The power transmission system 10000 has a second three-motor four-wheel drive mode. When the power transmission system 10000 is in the second three-motor four-wheel drive mode, only one of the two motors 101 of the second power assembly 1000 works, and both of the two motors 101 of the first power assembly 1000 work. The second locking device C2 synchronizes the corresponding first power component 100a and second power component 100b.

The power transmission system 10000 has a first four-motor four-wheel drive mode. When the power transmission system 10000 is in the first four-motor four-wheel drive mode, the two motors 101 of the first power assembly 1000 work, and the two motors 101 of the second power assembly 1000 work.

The power transmission system 10000 has a second four-motor four-wheel drive mode. When the power transmission system 10000 is in the second four-motor four-wheel drive mode, the two motors 101 of the first power assembly 1000 work, and the two motors 101 of the second power assembly 1000 work. When the front wheel on one side slips, the first locking device C1 synchronizes the corresponding first power component 100a and second power component 100b.

The power transmission system 10000 has a third four-motor four-wheel drive mode. When the power transmission system 10000 is in the third four-motor four-wheel drive mode, the two motors 101 of the first power assembly 1000 work, and the two motors 101 of the second power assembly 1000 work. When the rear wheel on one side slips, the second locking device C2 synchronizes the corresponding first power component 100a and second power component 100b.

The power transmission system 10000 has a fourth four-motor four-wheel drive mode. When the power transmission system 10000 is in the fourth four-motor four-wheel drive mode, the two motors 101 of the first power assembly 1000 work, and the two motors 101 of the second power assembly 1000 work. When the front wheel on one side slips and the rear wheel on one side slips, the first locking device C1 synchronizes the corresponding first power component 100*a* and the second power component 100*b*, and the second locking device C2 synchronizes the corresponding first power component 100*a* and second power component 100*b*.

According to the power transmission system 10000 of embodiments of the present invention, the front and rear power assemblies 1000 are both electrically driven, and the front and rear power assemblies 1000 each adopt a two-way locking device 200*b*. The power transmission system 10000 has multiple modes, is more suitable for various working conditions that occur during actual running of the vehicle, and thus, has good power performance and good adaptability.

A vehicle according to some embodiments of the present invention includes the power assembly 1000 of the above embodiments.

A vehicle according to some embodiments of the present invention includes the power transmission system 10000 of the above embodiments.

A vehicle according to some embodiments of the present invention includes the locking device 200 of the above embodiments.

It can be understood that various embodiments of the power assembly 1000, the power transmission system 10000 and the locking device 200 of the present invention can be used for mutual reference. For example, the second flange 201*b* in the two-way locking device 200*b* of FIG. 25 to FIG. 29 can be applied to the one-way locking device 200*a*. For example, the flanges of FIG. 20 to FIG. 24 can be applied to the two-way locking device 200*b*, as well as to the one-way locking device 200*a*. For example, in some of the one-way locking devices 200*a*, the second flange 201*b* in the two-way locking device 200*b* of FIG. 25 to FIG. 29 is used, and the structure of the first flange 201*a* selectively synchronous with the second flange 201*b* can refer to the structure of the first flange 201*a* of FIG. 16 to FIG. 19. However, in this embodiment, the first flange 201*a* is not provided with the ejector pin 2032.

Further, in the present invention, the flange may be the first flange 201*a*, the flange may also be the second flange 201*b*, and the two flanges may include the first flange 201*a* and the second flange 201*b*.

In the description of the present invention, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present invention and simplifying the description, rather than indicating or implying that the apparatus or element should have a particular orientation or be constructed and operated in a particular orientation, and therefore, should not be construed as a limitation on the present invention.

In addition, terms "first" and "second" are used only for description purposes, and shall not be understood as indicating or suggesting relative importance or implicitly indicating a quantity of indicated technical features. Therefore, features defined by "first" and "second" may explicitly or implicitly include at least one feature. In the description of the present invention, unless otherwise specifically limited, "multiple" means at least two, for example, two or three.

In the present invention, it should be noted that unless otherwise clearly specified and limited, the terms "mounted", "connected", "connection", and "fixed" should be understood in a broad sense. For example, a connection may be a fixed connection, a detachable connection, or an integral connection; may be a mechanical connection or an electrical connection, or mutual communication; may be a direct connection or an indirect connection by means of an intermediate medium; or may be internal communication between two elements or interaction relationship between two elements, unless otherwise clearly limited. A person of ordinary skill in the art may understand specific meanings of the terms in the present invention according to specific situations.

In the present invention, unless otherwise clearly specified and limited, that a first feature is "above" or "below" a second feature may be that the first and the second features are in contact with each other directly, or the first and the second features are in contact with each other indirectly by using an intermediate medium. Moreover, that the first feature is "above", "over", and "on" the second feature may be that the first feature is right above the second feature or at an inclined top of the second feature, or may merely indicate that the horizontal height of the first feature is higher than that of the second feature. That the first feature is "below", "under", and "beneath" the second feature may be that the first feature is right below the second feature or at an inclined bottom of the second feature, or may merely indicate that the horizontal height of the first feature is lower than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present invention. In this specification, schematic descriptions of the foregoing terms do not need to aim at a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in the specification, as long as they do not conflict each other.

Although the embodiments of the present invention are shown and described above, it can be understood that, the foregoing embodiments are exemplary, and cannot be construed as a limitation to the present invention. Within the scope of the present invention, a person of ordinary skill in the art may make changes, modifications, replacement, and variations to the foregoing embodiments.

What is claimed is:

1. A locking device, comprising:
   a first flange, the first flange being adapted to be fixed on a first shaft;
   a second flange, the second flange being adapted to be fixed on a second shaft;
   a first flange locking structure, the first flange locking structure being configured to selectively lock the first flange and the second flange to be adapted to rotate the second flange synchronously with the first flange; and
   a second flange locking structure, the second flange locking structure being configured to selectively lock the second flange and the first flange to be adapted to rotate the first flange synchronously with the second flange, wherein the first flange locking structure and the second flange locking structure each comprise:
- a synchronizing ring, the synchronizing ring being normally connected to the corresponding flange to be adapted to rotate synchronously with the corresponding flange, and the synchronizing ring being slidable relative to the corresponding flange; and
- a driving component, the driving component selectively pushing the synchronizing ring to slide from an unlocked position to a locked position in an axial direction of the corresponding flange,
- wherein when the synchronizing ring is in the locked position, the two synchronizing rings are connected to be adapted to rotate the other flange synchronously with the flange corresponding to the synchronizing ring, and when the synchronizing ring is in the unlocked position, the two synchronizing rings are separated.

2. The locking device according to claim 1, wherein the driving component comprises:
- an electromagnet, the electromagnet being adapted to be fixed on a housing;
- an ejector pin, one end of the ejector pin being slidably connected to the corresponding flange; and
- a driving member, the driving member having a driving profile, and the other end of the ejector pin being matched with the driving profile,
- wherein the electromagnet is selectively energized, and when the electromagnet is energized, the driving member is fixed to drive the ejector pin to move in the axial direction of the corresponding flange through the driving profile, and to push the corresponding synchronizing ring to move from a position where the two synchronizing rings are separated to a position where the two synchronizing rings are connected.

3. The locking device according to claim 2, wherein the ejector pin and the driving profile are both multiple and in one-to-one correspondence, and the ejector pins are spaced apart in a circumferential direction of the corresponding flange.

4. The locking device according to claim 2, wherein the driving profile is a V-shaped profile, and in the axial direction of the corresponding flange, the opening of the V-shaped profile increases from one end away from the other flange to one end near the other flange.

5. The locking device according to claim 4, wherein in the axial direction of the corresponding flange, a side wall of the V-shaped profile extends along a straight line or an arc from one end away from the other flange to one end near the other flange.

6. The locking device according to claim 2, wherein the first flange locking structure and the second flange locking structure each further comprise a bushing, the bushing being sleeved over and fixed on the corresponding flange, and in the axial direction of the corresponding flange, the electromagnet being sandwiched between the bushing and the corresponding housing.

7. The locking device according to claim 2, wherein the first flange and the second flange each comprise:
- a fixing sleeve, the fixing sleeve being sleeved over and fixed on the corresponding shaft, and both the electromagnet and the driving member being sleeved over the fixing sleeve;
- a mounting sleeve, the mounting sleeve having a through hole extending through the mounting sleeve in the axial direction of the corresponding flange, and the ejector pin being slidably disposed in the through hole; and
- a guiding sleeve, the guiding sleeve being provided with a guiding groove, and the ejector pin being slidably disposed in the guiding groove.

8. The locking device according to claim 7, wherein in the axial direction of the corresponding flange, the fixing sleeve, the mounting sleeve and the guiding sleeve are connected sequentially and the distance to the other flange is decreased.

9. The locking device according to claim 7, wherein the guiding groove of the first flange is disposed on an inner circumferential surface of the guiding sleeve, and the guiding groove of the second flange is disposed on an outer circumferential surface of the guiding sleeve.

10. The locking device according to claim 7, wherein an outer circumferential surface of the synchronizing ring of the first flange locking structure is provided with an outer ring gear portion, and the inner circumferential surface of the guiding sleeve of the first flange locking structure is provided with an inner tooth groove matched with teeth of the outer ring gear portion; and an inner circumferential surface of the synchronizing ring of the second flange locking structure is provided with an inner ring gear portion, and the outer circumferential surface of the guiding sleeve of the second flange locking structure is provided with an outer tooth groove matched with teeth of the inner ring gear portion.

11. The locking device according to claim 2, wherein an inner circumferential surface of the synchronizing ring of the first flange locking structure is provided with an inner ring gear portion, and an outer circumferential surface of the synchronizing ring of the second flange locking structure is provided with an outer tooth groove adapted to be matched with teeth of the inner ring gear portion.

12. The locking device according to claim 1, wherein the first flange locking structure and the second flange locking structure each further comprise: a stop piece and an elastic return member, the elastic return member being connected to the stop piece, the stop piece being connected to the corresponding flange, in the axial direction of the corresponding flange, the elastic return member being located between the corresponding synchronizing ring and the stop piece, and during the movement of the corresponding synchronizing ring from the unlocked position to the locked position, the elastic return member is compressed.

13. The locking device according to claim 12, wherein the elastic return member is a wave spring.

14. A power assembly, comprising:
- a first power component and a second power component, the first power component being configured to drive a wheel on the left side, the second power component being configured to drive a wheel on the right side, the first power component and the second power component each comprising a motor and a transmission, and the transmission being adapted to be connected between the motor and the wheel on the corresponding side; and
- a locking device, comprising:
  - a first flange, the first flange being adapted to be fixed on a first shaft;
  - a second flange, the second flange being adapted to be fixed on a second shaft;
  - a first flange locking structure, the first flange locking structure being configured to selectively lock the first flange and the second flange to be adapted to rotate the second flange synchronously with the first flange; and a second flange locking structure, the second flange locking structure being configured to selectively lock the second flange and the first flange to be adapted to rotate the first flange synchronously with the second flange, wherein the first flange locking structure and the second flange locking structure each comprise:

a synchronizing ring, the synchronizing ring being normally connected to the corresponding flange to be adapted to rotate synchronously with the corresponding flange, and the synchronizing ring being slidable relative to the corresponding flange; and a driving component, the driving component selectively pushing the synchronizing ring to slide from an unlocked position to a locked position in an axial direction of the corresponding flange, wherein when the synchronizing ring is in the locked position, the two synchronizing rings are connected to be adapted to rotate the other flange synchronously with the flange corresponding to the synchronizing ring, and when the synchronizing ring is in the unlocked position, the two synchronizing rings are separated;

the first power component comprising the first shaft, the second power component comprising the second shaft, the first flange being fixed on the first shaft, the second flange being fixed on the second shaft, the first flange locking structure being configured to selectively synchronize the first shaft and the second shaft such that the second shaft rotates synchronously with the first shaft, and the second flange locking structure being configured to selectively synchronize the second shaft and the first shaft such that the first shaft rotates synchronously with the second shaft.

15. The power assembly according to claim 14, wherein the transmission is a three-stage reducer, the three-stage reducer comprising:

an input shaft, the input shaft being provided with a primary driving gear, and the input shaft being connected to the motor;

a first intermediate shaft, the first intermediate shaft being provided with a primary driven gear and a secondary driving gear, and the primary driven gear meshing with the primary driving gear;

a second intermediate shaft, the second intermediate shaft being provided with a secondary driven gear and a tertiary driving gear, and the secondary driven gear meshing with the secondary driving gear; and an output shaft, the output shaft being connected to the wheel on the corresponding side, the output shaft being provided with a tertiary driven gear, and the tertiary driven gear meshing with the tertiary driving gear, wherein one of the input shaft, the first intermediate shaft, the second intermediate shaft and the output shaft of the first power component is the first shaft, and one of the input shaft, the first intermediate shaft, the second intermediate shaft and the output shaft of the second power component is the second shaft.

16. The power assembly according to claim 15, wherein the locking device is connected between the two second intermediate shafts to selectively synchronize the two second intermediate shafts.

17. A power transmission system comprising at least one power assembly, the power assembly comprising: .

a first power component and a second power component, the first power component being configured to drive a wheel on the left side, the second power component being configured to drive a wheel on the right side, the first power component and the second power component each comprising a motor and a transmission, and the transmission being adapted to be connected between the motor and the wheel on the corresponding side; and a locking device, comprising:

a first flange, the first flange being adapted to be fixed on a first shaft;

a second flange, the second flange being adapted to be fixed on a second shaft;

a first flange locking structure, the first flange locking structure being configured to selectively lock the first flange and the second flange to be adapted to rotate the second flange synchronously with the first flange; and a second flange locking structure, the second flange locking structure being configured to selectively lock the second flange and the first flange to be adapted to rotate the first flange synchronously with the second flange, wherein the first flange locking structure and the second flange locking structure each comprise:

a synchronizing ring, the synchronizing ring being normally connected to the corresponding flange to be adapted to rotate synchronously with the corresponding flange, and the synchronizing ring being slidable relative to the corresponding flange; and a driving component, the driving component selectively pushing the synchronizing ring to slide from an unlocked position to a locked position in an axial direction of the corresponding flange, wherein when the synchronizing ring is in the locked position, the two synchronizing rings are connected to be adapted to rotate the other flange synchronously with the flange corresponding to the synchronizing ring, and when the synchronizing ring is in the unlocked position, the two synchronizing rings are separated;

the first power component comprising the first shaft, the second power component comprising the second shaft, the first flange being fixed on the first shaft, the second flange being fixed on the second shaft, the first flange locking structure being configured to selectively synchronize the first shaft and the second shaft such that the second shaft rotates synchronously with the first shaft, and the second flange locking structure being configured to selectively synchronize the second shaft and the first shaft such that the first shaft rotates synchronously with the second shaft.

18. The power transmission system according to claim 17, wherein the first power component and the second power component of the same power assembly each comprise a housing, and the motor and the transmission disposed in the housing, the two housings are connected and a connecting portion of the two housings defines an accommodating cavity, and the locking device is disposed in the accommodating cavity.

19. The power transmission system according to claim 17, wherein the quantity of the power assemblies is one, and the power assembly is configured to drive a front wheel or a rear wheel of a vehicle.

20. The power transmission system according to claim 17, wherein the quantity of the power assemblies is two, one of the power assemblies is configured to drive a front wheel of a vehicle and the other power assembly is configured to drive a rear wheel of the vehicle.

\* \* \* \* \*